Figure 1:
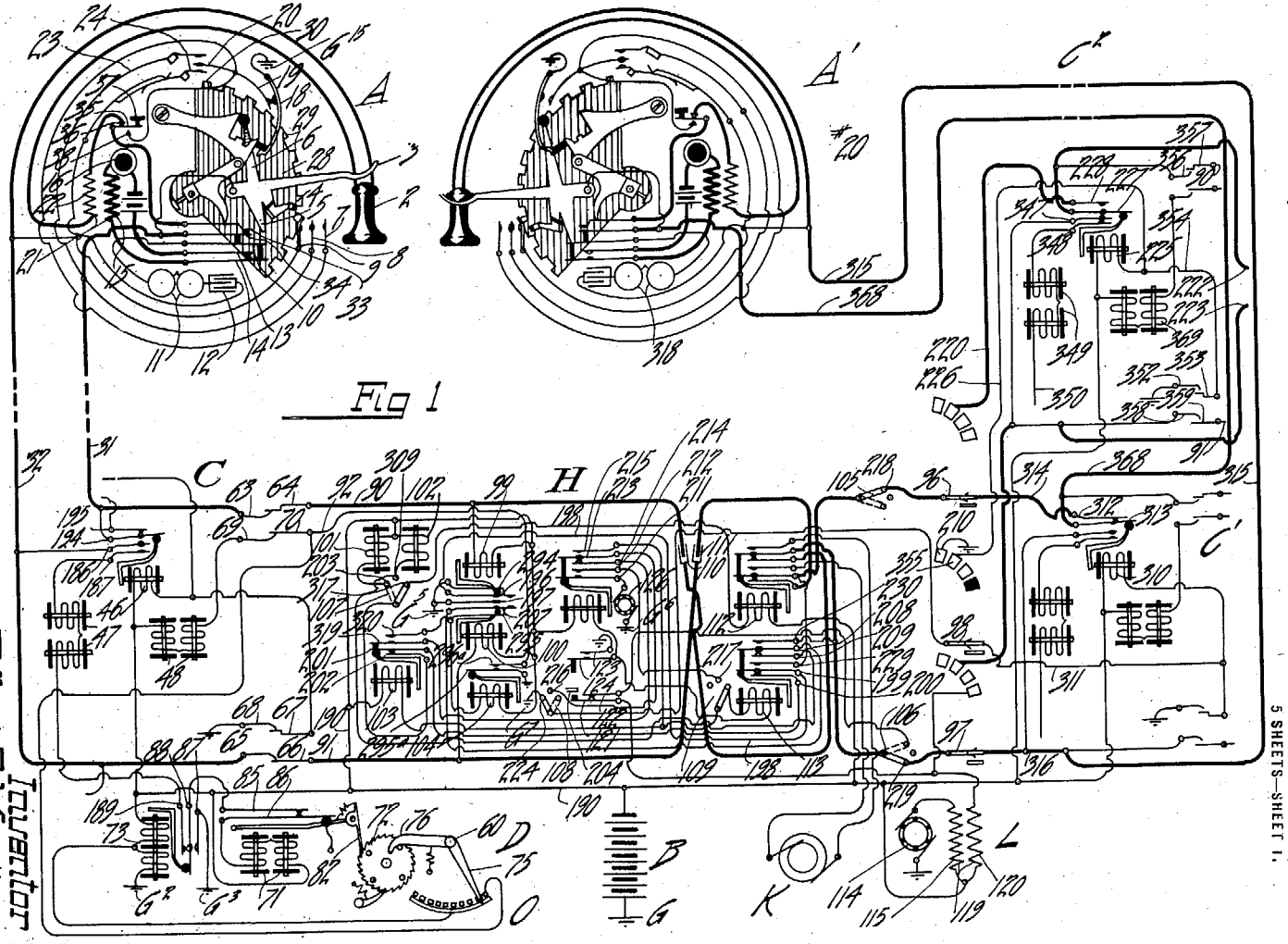

T. G. MARTIN.

TELEPHONE TRUNKING SYSTEM.

APPLICATION FILED MAY 28, 1917.

Reissued Oct. 5, 1920. 14,954.

5 SHEETS—SHEET 1.

Inventor
Talbot G. Martin
E. D. Fales.
Attorney

T. G. MARTIN.

TELEPHONE TRUNKING SYSTEM.

APPLICATION FILED MAY 28, 1917.

Reissued Oct. 5, 1920. 14,954.

5 SHEETS—SHEET 2.

Inventor
Talbot G. Martin
E. D. Yates.
Attorney

T. G. MARTIN.

TELEPHONE TRUNKING SYSTEM.

Reissued Oct. 5, 1920. APPLICATION FILED MAY 28, 1917. 14,954.

5 SHEETS—SHEET 3.

Inventor
Talbot G. Martin
E. D. Fales.
Attorney

T. G. MARTIN.

TELEPHONE TRUNKING SYSTEM.

APPLICATION FILED MAY 28, 1917.

Reissued Oct. 5, 1920.

14,954.

5 SHEETS—SHEET 4.

Inventor
Talbot G. Martin.
E. D. Fales
Attorney

T. G. MARTIN.

TELEPHONE TRUNKING SYSTEM.

APPLICATION FILED MAY 28, 1917.

Reissued Oct. 5, 1920. 14,954.

5 SHEETS—SHEET 5.

Inventor:
Talbot G. Martin,
E. D. Fales.
Attorney.

UNITED STATES PATENT OFFICE.

TALBOT G. MARTIN, OF CHICAGO, ILLINOIS, ASSIGNOR, BY MESNE ASSIGNMENTS, TO AUTOMATIC ELECTRIC COMPANY, A CORPORATION OF ILLINOIS.

TELEPHONE TRUNKING SYSTEM.

14,954. Specification of Reissued Letters Patent. Reissued Oct. 5, 1920.

Original No. 1,201,600, dated October 17, 1916, Serial No. 394,984, filed September 28, 1907. Application for reissue filed May 28, 1917. Serial No. 171,604.

*To all whom it may concern:*

Be it known that I, TALBOT G. MARTIN, a citizen of the United States of America, and resident of Chicago, Cook county, Illinois, have invented a certain new and useful Improvement in Telephone Trunking Systems, of which the following is a specification.

My invention relates to telephone systems in general, but more particularly to automatic or semi-automatic telephone exchange systems, and especially to systems in which automatic or semi-automatic trunking service may be required between two or more of the exchanges or central stations comprised in such system.

In certain respects my present invention is in the nature of an improvement on my Patent No. 1,109,650, granted September 1, 1914, for improvement in Telephone Exchange Systems, inasmuch as it involves separate and distinct means for automatically trunking in opposite directions over a trunk-line; and it is also in the nature of an improvement on the system disclosed in the patent to Wilson L. Campbell for improvement in telephone systems, No. 1,181,092, granted April 25, 1916, inasmuch as I have herein disclosed an improved arrangement of rotary connectors—that is to say, connectors which are adapted to rotate and automatically select idle trunk-lines, the rotary or automatic trunk-selecting feature being limited or confined to a certain level, and the other levels thereof being employed for ordinary service—that is to say, for completing the final connections directly with the lines of the called subscribers.

My present invention, however, contemplates broadly a combined connector and repeater, with provisions for bringing the repeater mechanism into play only when the connector is operated at a certain level; and it also contemplates broadly an automatic connector which is rotary or trunk-selecting in character at a certain level only, and which at this level is also adapted to have its line relays serve as part of the mechanism for then repeating or relaying switch-operating impulses over the automatically selected idle trunk-line.

As herein disclosed, my present invention and improvements are embodied in a system comprising a main automatic exchange and a branch automatic exchange connected together by two-way trunk-lines; the equipment of the main automatic exchange including first and second selectors and connectors for enabling the subscribers thereof to call each other automatically; the equipment of the branch exchange including subscribers' non-numerical trunking switches and connectors, without any intermediate selectors, whereby the subscribers thereof can call each other automatically. Furthermore, as herein disclosed, there are two-way trunk-lines between the two exchanges, each trunk-line terminating in a first-selector and a repeater at the main exchange, as well as in second-selector bank terminals; and at the branch exchange each of said trunk-lines terminates in a non-numerical trunking switch, as well as in multiple terminals of the connectors of this exchange. The said connectors of the branch exchange are adapted for use in giving ordinary service between the subscribers thereof, and are also adapted, when raised to a certain level, to rotate automatically and thereby automatically select an idle trunk leading to the main exchange; and these connectors which are, so to speak, rotary or trunk-selecting when operated at a certain level, are also adapted to serve as repeaters, both the trunk-selecting and repeating functions of these connectors being brought about, for example, by raising any connector to the tenth level, all other levels of the bank terminals of the connectors being reserved for ordinary service—that is to say, for making the final connections directly with the lines of called subscribers.

With such arrangement any subscriber at the branch exchange can call any other subscriber thereof, and can also automatically call any subscriber at the main exchange, inasmuch as the connector which seizes an idle trunk-line will then serve as a repeater for controlling the first-selector at the other end of said trunk-line, as well as for controlling the second-selector and ordinary connector necessarily brought into use in extending the connection to and finding the line of the called subscriber at the main exchange. Also, with this arrangement any subscriber of the main exchange can call any other subscriber thereof, and can also automatically call any subscriber at the branch exchange, as by raising the second-selector at the main exchange to a certain level the calling subscriber thereof can obtain connection with the repeater of an idle trunk-line leading to the branch exchange, and said repeater can then be employed for controlling the non-numerical trunking switch at the other end of the said trunk-line, as well as for controlling the connector necessarily brought into use at the branch exchange for completing connection to and finding the line of the called subscriber thereof. Means are provided, as will hereinafter more fully appear, whereby when one of said trunk-lines is used in one direction, no subscriber can interfere with such use by attempting to use it in the same direction, or by attempting to seize it for use in the opposite direction. In this way I provide a system in which automatic service is provided between all of the subscribers thereof, and in which the connectors of a small branch exchange may be employed for automatically trunking a calling subscriber thereof to the main exchange, and for then controlling whatever automatic apparatus is necessary in completing the connection to the line of the called subscriber at the main exchange; and, as explained, this arrangement permits the subscribers of the main exchange to use the first and second selectors thereof for obtaining connection with repeaters and trunk-lines leading to the branch exchange.

The nature and advantages of my invention will, however, hereinafter more fully appear.

Figure 2:
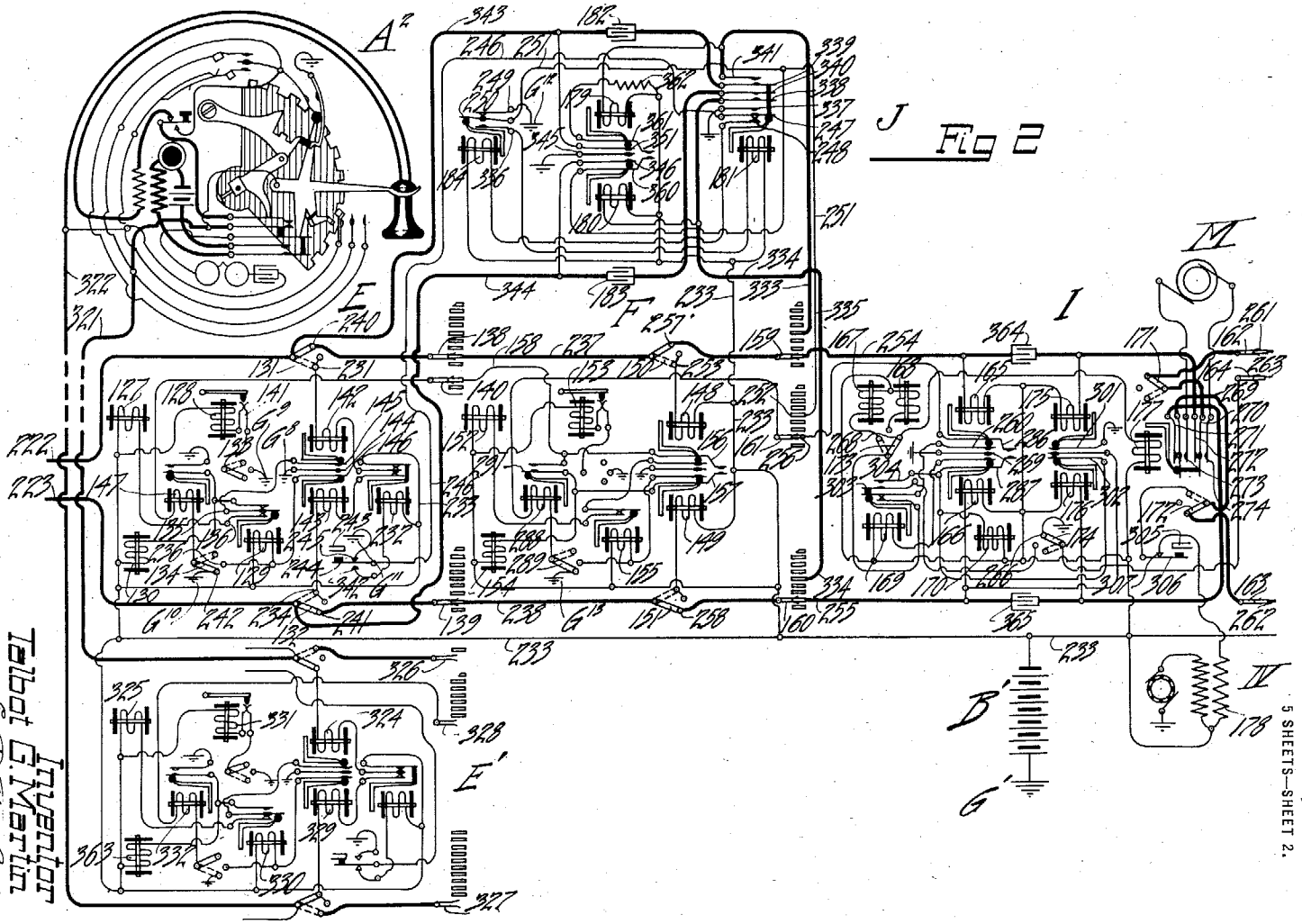
Figure 3:
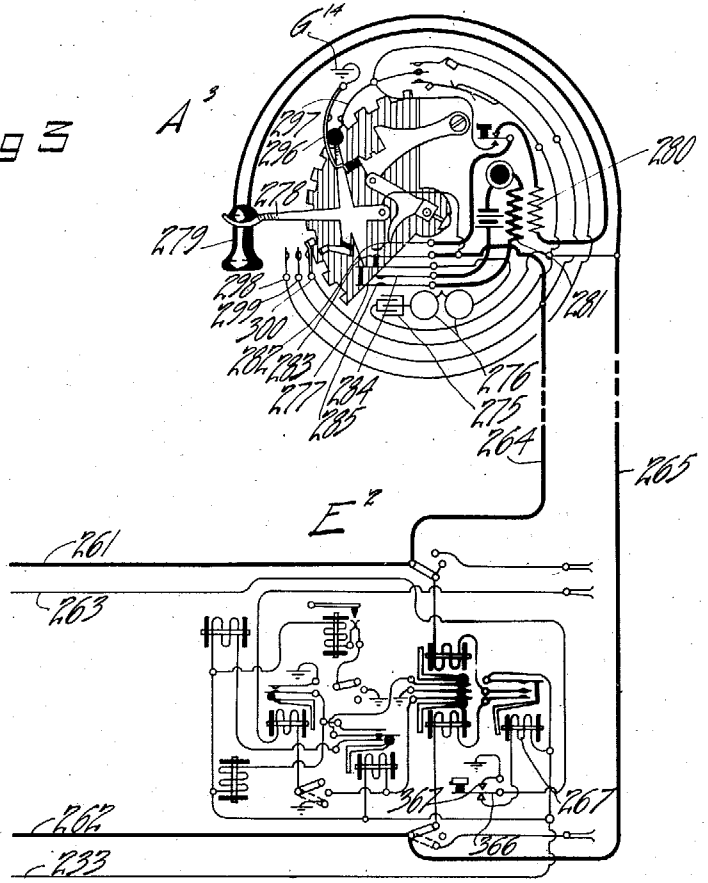
Figures 4, 5:
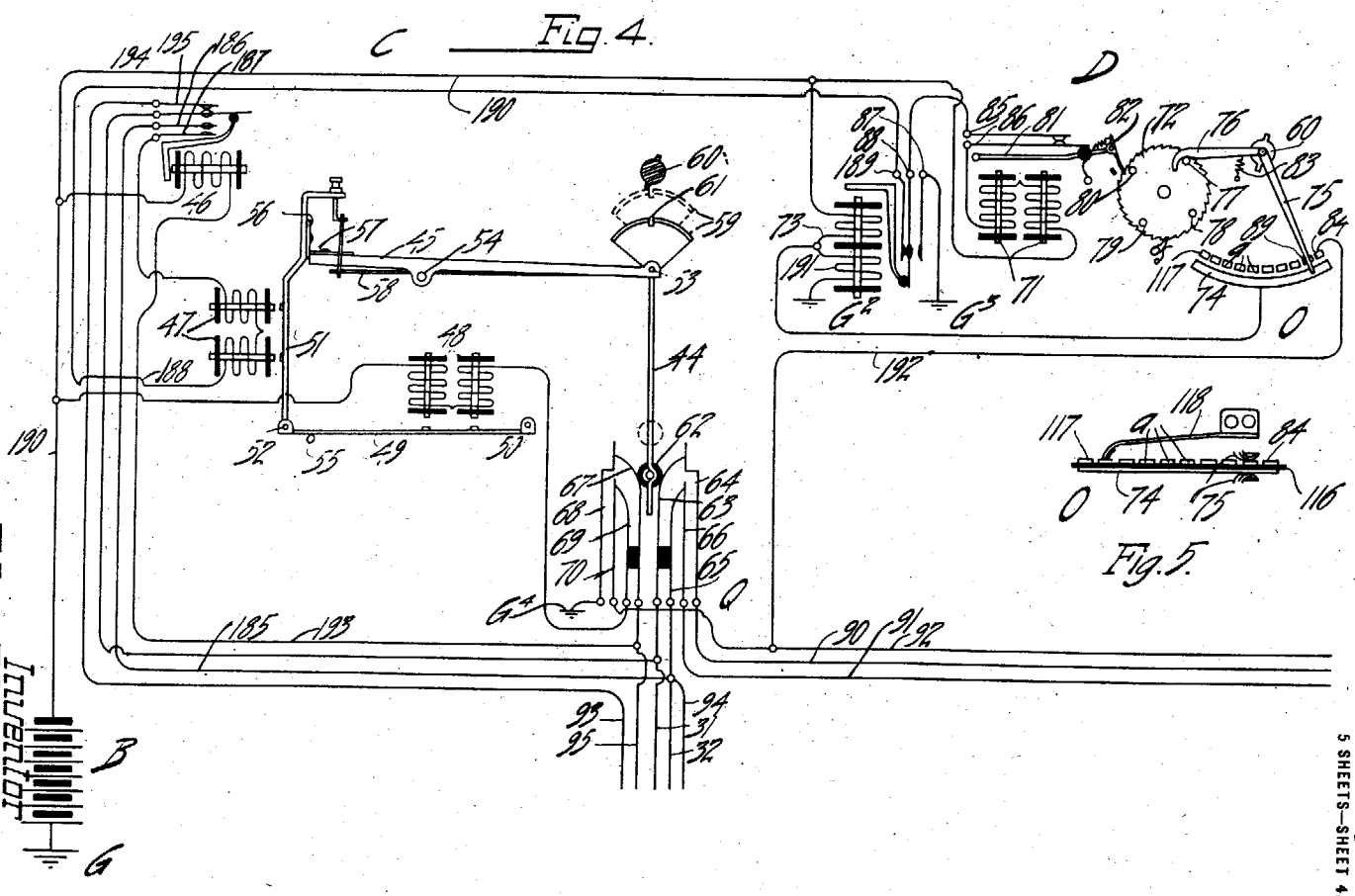
Figure 6:
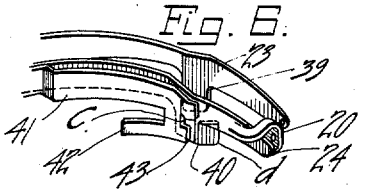

In the accompanying drawings Figure 1 represents diagrammatically a sub-central or private branch exchange in which the substation A is shown as having operated its line switch C and the connector H to establish connection with the substation A′, which latter is allotted to the line switch C′, in a system embodying the principles of my invention. In Fig. 2 there is shown diagrammatically a central station switching apparatus in connection with which I have elected to explain my invention. The first-selector switches E and E′ are of the type disclosed in United States Patent No. 815,321, granted March 13, 1906, to Keith, Erickson and Erickson, while the second-selector F is a modified form of the selector shown in said patent. The connector switch shown at I is of the general type shown in United States Patent No. 815,176, granted March 13, 1906, to Keith, Erickson and Erickson. At J is diagrammatically represented a repeater, and at $A^2$ is a substation like the substations A and A′. All of the switches E, E′, F, I and J are allotted to the main or central station. In Fig. 3 there is represented another first-selector $E^2$, with its allotted substation $A^3$ of the main central station. Fig. 4 is an enlarged view of the line switch C and its allotted master switch D. Fig. 5 is a detail view of the bank O of the master switch D. Figs. 6, 7, 8, 9, 10, 11 and 12 are detail views showing the various positions of the impulse springs of the substation A.

Figs. 1, 2 and 3 taken together represent the system as a whole, comprising the subscriber's equipment at substation A of the private branch or sub-central exchange, and the subscriber's equipment at sub-station $A^3$ of the main or central exchange.

Figure 7:
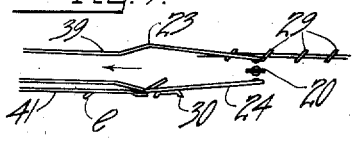
Figure 8:
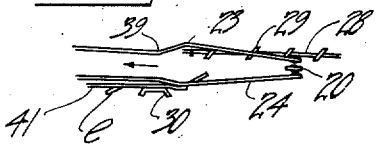

The substations are all alike and may be of any suitable or approved type. The substation A, for example, comprises a receiver 2, a switch-hook 3 for controlling the substation circuits, which controlling operations are accomplished through the medium of any suitable means, such as the cam-arms 4, 5 and 6. As the switch-hook is lowered the cam-arm 4 momentarily presses the release springs 7, 8 and 9 into engagement, whereby the substation line conductors may be grounded simultaneously, if the springs 18 and 19 are in contact, for the purpose of releasing the switching apparatus at the central station. When the switch-hook is down the cam-arm 5 engages the spring 10, thereby bringing the ringer 11 in series with the condenser 12 across the line. Furthermore, when the switch-hook is down the said cam-arm 5 disengages the springs 13 and 14, thus breaking the local circuit which includes in series the primary winding 15, transmitter 16 and local battery 17. The substation ground circuit is normally broken between the ground springs 18 and 19 by the cam arm 6; but when the said springs are together ground is provided to the ground post 20 and to the release spring 7, as is usual in telephone equipments of this type. The said substation comprises the usual induction-coil 21 having the primary winding 15 and secondary winding 22. Being an automatic substation it is provided with the vertical and rotary impulse springs 23 and 24. Said substation is, of course, provided with a dial (not shown) which is secured to the shaft 25, together with the locking dog 26. Furthermore, there is a locking cam 27 that locks the dog 26 while the receiver is on the switch-hook to prevent a rotation of the dial. For operating the impulse springs 23 and 24 the substation is provided with an impulse wheel 28 that is secured to the shaft, which impulse wheel carries on its periphery the so-called vertical impulse teeth 29 and one rotary impulse tooth 30. The said impulse teeth are so arranged that when the dial is drawn down the impulse spring 23 is not carried into contact with the ground post 20, but only as the dial returns, whereby the vertical impulse spring 23 is pressed onto the said ground post 20 by one or more of the vertical impulse teeth, and after the latter have completed their work the rotary impulse tooth, in a similar manner, operates the rotary impulse spring 24. In this operation the subscriber's vertical line conductor 31 is first given a number of ground impulses, and then the rotary line conductor 32 is given one ground impulse. It will be seen that the construction is such that as long as the dial is out of normal position the dog 26 permits the primary circuit springs 33 and 34 to separate, thus preventing the impulses that are delivered to either line conductor from passing to the other. The vertical impulse spring 23 is provided with an oblique projection or lug 39 (see Figs. 6 to 12, inclusive) on the under side of which the vertical impulse teeth 29 are adapted to engage for intermittently driving the spring 23 onto the ground post 20. The rotary impulse spring 24 is provided with somewhat similar mechanism for driving the said rotary spring onto the ground post once when the dial is rotated in one direction, and once when rotated in the opposite direction. The said rotary impulse spring 24 has on its under side a V-shaped member 40 having two sides *c* and *d*, and there is, in addition, an auxiliary spring 41 which works in conjunction with the said V-shaped member. As shown more clearly in Fig. 6, the auxiliary spring 41 is provided with a lower curved part *e* having the rear section 42 curving outwardly, as shown in Figs. 7, 8, 9, 10, 11 and 12. The front section 43 of said member *e* is designed to fall just behind the apex of the V-shaped member 40, so that the rotary impulse tooth 30, when moved in the direction indicated by the arrow in Fig. 7, will pass onto the curved member *e*, thus pressing the rotary impulse spring 24 onto the ground post 20 for a comparatively long time, as shown in Fig. 8, thus sending a comparatively long impulse to the line.

Figure 9:
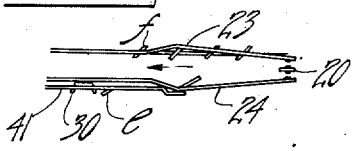
Figure 10:
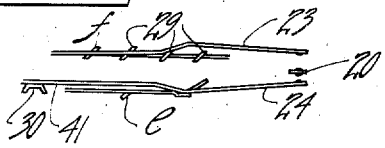
Figure 11:
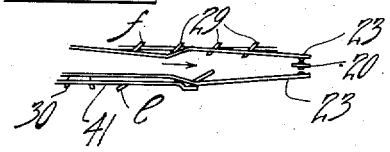
Figure 12:
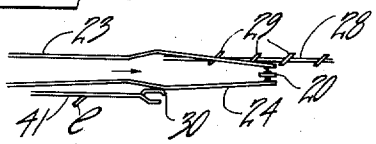

As the impulse wheel advances, the vertical impulse teeth 29 approach the lug 39 of the vertical impulse spring 23 (Fig. 8), and eventually the first tooth *f* that meets the lug 39 clears the said lug, as shown in Fig. 9. but not until after the rotary impulse tooth 30 clears the curved member *e*. As the impulse wheel continues to advance in the direction of the arrow (Fig. 9), the succeeding impulse teeth 29 will clear the projection 39, as shown in Fig. 10. Then when the impulse wheel is released, first the vertical impulse spring 23 is carried into engagement with the ground post 20 by the vertical impulse teeth previously cleared, as indicated in Fig. 11; and as the impulse wheel nears its normal position the rotary impulse tooth 30 passes under the curved member *e* of the auxiliary spring 41 (Fig. 12), engaging the V-shaped member 40 directly and for a short time only, sending the ordinary impulse to the line 32 through the medium of the rotary impulse spring 24, after which the said member 40 is cleared or disengaged, as shown in Fig. 7. The operations as thus described are repeated each time that the dial is operated, and the number of impulses produced through the medium of the vertical impulse spring 23 are accurately and definitely determined at each operation of the dial by the finger-hole which the subscriber selects thereon. The means whereby the subscriber may signal the called subscriber comprises the push-button spring 35 which normally engages the contact point 36; but when the button 37 is pressed the spring 35 engages the contact point 38, whereby the vertical line conductor 31 may be grounded. As shown in Fig. 4, the individual switch comprises a plunger 44, plunger arm 45, bridge-cut-off relay 46, trip magnet 47 and switch-release magnet 48, all of which are built about a switch-base or frame (not shown) of any suitable or approved design. The said switch-release magnet is provided with an armature 49 that is pivoted on a pin 50 which rises from the base of the switch. The said armature carries pivotally secured on its end a second armature 51 that is controlled by the trip magnet 47. The pin 52 about which the armature 51 oscillates is carried on the end of the armature 49. The plunger 44 is pivotally secured by the pin 53 to the plunger arm 45, which latter is in turn pivoted to a pin 54 that rises from the switch frame. The lug 55 is stamped out of the side of the frame and is provided as a stop or rest for the armature 49. Upon the armature 51 is secured the catch 56 which is adapted to engage the plate 57 on the end of the plunger arm 45. Furthermore, the said line switch is provided with a bank of terminals, usually ten in number, only one of which is shown at Q in Fig. 4. As shown, the said terminal Q is turned from its true position with respect to the swing of the plunger 44, and the bushing 62 is correspondingly turned, all for the purpose of making the illustration clearer. The terminal Q comprises the springs 63 and 64, 65 and 66, 67 and 68, and 69 and 70. The said springs are normally disconnected from each other, but are driven into contact in the above-mentioned order when the plunger 44 operates. When the plunger 44 is in locked engagement with the plunger shaft 60, the notch 61 is in engagement with the flange or web of the shaft 60, and when in sliding engagement the hub rests in the position shown by the dotted lines in Fig. 4—that is, when the plunger shaft is operated the plunger 44 is not carried along with the locked plungers, but remains in the dotted position; the plunger shaft sliding upon the end 59. The general operation of the switch is as follows: The trip magnet 47 is energized by a preliminary impulse, and the armature 51 is attracted against the magnet cores. When the armature 51 is attracted the catch 56 slides out of contact with the end 57 of the plunger arm 45, and the said plunger arm 45, owing to the tension of the spring 58, moves about the pin 54 and thrusts the plunger 44 into the bank terminal Q (shown in Fig. 4), and when the trip magnet again deënergizes, the trip armature 51 falls against the end of the plunger arm 45.

The switch is restored when the release magnet 48 becomes energized, whereby the armature 49 is arranged, and accordingly the trip armature 51 is moved upwardly until the catch 56 slides over the end 57; then when the release magnet 48 becomes deënergized the armature 49 returns to normal position by the action of the spring 58, since the plate 56 is now locked on top of the plate 57, and the armature 49 remains at rest against the stop 55. Furthermore, since the plunger arm 45 is now in engagement with the armature 51, the said plunger arm is also moved about the pin 54, whereby the plunger 44 is moved from the terminal Q. Also, since the plunger shaft has advanced one step, the hub 59 of the plunger 44 comes to rest in the position shown by the dotted line in Fig. 4, in sliding engagement with the plunger shaft 60; and as the said plunger shaft advances each time an idle trunk is seized, the plunger 44 is not advanced, but remains in this position opposite the trunk terminal from which it has just disengaged, since the slot 61 is not in engagement with the plunger shaft 60. After all the trunk lines have been successively seized, and the shaft 60 is released from its last position, said shaft then starts toward the starting point and picks up the plunger 44, when the saddle of said shaft, over which the slot 61 normally rides, arrives at the position at which the plunger 44 was originally released—that is, the plunger passes into locked engagement with the shaft when the slot 61 slips over the saddle of said shaft. From thence on the plunger 44 is carried by the shaft 60 until it is again released when another call is made. But if, after the plunger is released, and before the shaft 60 returns to pick up said plunger, the switch C is again operated, the plunger 44 again engages the same terminal Q. The master switch D, which may be of any suitable or approved type, is provided for operating the plunger shaft 60, and for controlling certain circuits that will be disclosed hereinafter. It comprises the following details: A motor magnet 71 for operating the ratchet wheel 72, which latter is designed for operating the plunger shaft 60, and a differential relay 73 for controlling the energizing circuit of the motor magnet 71. The said master switch also has a bank O comprising a plurality of individual contact segments *a*, and a common metallic segment 74, as shown in Fig. 4. The wiper 75 is adapted to remain in constant engagement with the bank O, and to maintain some one of the segments *a* in electrical connection with the common segment 74. The wiper 75 is operated in a step-by-step manner by the ratchet wheel 72, through the medium of a cam member 76 rigidly secured to the said wiper 75 and adapted to successively engage the pins 77, 78, 79 and 80 upon the said ratchet wheel 72. The motor magnet 71 is provided with an armature 81 upon the end of which there is suitably secured a pawl 82. Each time that the said magnet is energized the pawl 82 engages the ratchet wheel 72, advancing the latter one step. It will be seen, therefore, that as the ratchet wheel 72 advances, the wiper 75 advances step by step from right to left, and when the pin 77, for instance, clears the cam 76 the retracting spring 83 restores the wiper 75 to its first position at the right of the bank O and in engagement with the first segment 84. The said motor magnet 71 is provided with a couple of interrupter springs 85 and 86 that are included in the energizing circuit of the said motor magnet, which energizing circuit also comprises the springs 87 and 88 controlled by the differential relay 73. Therefore, whenever the differential relay 73 is energized the springs 87 and 88 are pressed into contact, and the motor magnet 71 operates step by step as long as the differential relay 73 remains energized. Furthermore, it is assumed that the terminal Q of the line switch C is the first terminal of the line switch bank. While in normal locked engagement with the shaft 60 the plunger 44 is retained in front of said terminal by the plunger shaft 60 as long as the master switch wiper 75 is in engagement with the bank segment 84; but as the motor magnet 71 advances the wiper 75 onto the second segment 89, the said plunger and all idle plungers similarly engaging the shaft 60 are carried opposite the next terminal of the line switch bank. The master switch bank O (Fig. 5) comprises the individual segments *a* separated from the common segment 74 by the insulating strip 116.

It will be seen that after the wiper 75 passes over the segments from right to left and engages the last segment 117, then on the next step the wiper 75 passes from the extreme left contact 117 to the contact 84 on the extreme right; but in passing from this extreme position to the other the upper part of the wiper 75 slides on the insulated member 118. This provision is made in order that the individual segments *a* may not be brought into contact with the common segments 74, whereby some interference with the successful operations of the master switch might be experienced. It should be noted that in each switch bank all of the springs 63 are permanently connected and may be made of one common piece. The springs 64, however, are individual—that is, there is one separate and distinct spring for every terminal Q, there being ten in the bank. The springs 65, 67, 68 and 69, like the springs 63, are also common, and the springs 66 and 70, like the springs 64, are individual. For every bank terminal Q there is a trunk-line of three conductors 90, 91 and 92 leading to a connector switch; and there is also a normal trunk-line comprising the conductors 93, 94 and 95 leading to the connector switch banks. The subscriber's line conductors 31 and 32 terminate in the springs 63 and 65 which, as has been stated, are common springs. When the subscriber operates the line switch C, and the plunger 44 engages the terminal Q, the subscriber's line conductors 31 and 32 are extended to the vertical and rotary trunk conductors 90 and 91, thence to the connector switch H.

The connector switch H is an improved form of the connector switch described in United States Patent No. 815,176. For instance, the connector switch shaft carries the line wipers 96 and 97 and the private wiper 98. The connector switch is also controlled by the calling subscriber through the medium of the vertical and rotary line relays 99 and 100. The vertical line relay 99 directly controls the vertical magnet 101 and also the rotary magnet 102. The function of the vertical magnet 101 is to give the shaft and shaft wipers a vertical motion, and the rotary magnet 102 imparts to the shaft and shaft wipers a rotary or circular motion. The rotary line relay 100 controls the private magnet 103, which latter, under certain conditions, controls in turn the vertical and rotary magnets 101 and 102, the release magnet 104, and also the side switch wipers 105, 106, 107, 108 and 109. The side switch of the connector, like the side switch of the selector, has a normal or first position, a second position and a third position. The release magnet 104 is also controlled by the vertical and rotary line relays 99 and 100 conjointly. By the use of the condensers 110 and 111 the connector circuit is divided into two sections. The relay 112 is provided for bridging the ringer generator K across the terminals of the called line. The relay 113, upon energizing, operates to disconnect the vertical and rotary line relay springs 196 and 207, respectively, from the side switch wiper 107 and private magnet 103, and to connect them instead to the shaft wipers 96 and 97, whereby the succeeding impulses from the connector vertical and rotary line relays are repeated to the conductors with which the wipers may be in contact. Furthermore, it should be noted that the release mechanism of the connector H operates like that of the selector switch disclosed in said selector patent, instead of like that of the connector described in said connector patent—that is, the release of the switch is accomplished when the release magnet deënergizes, instead of when the magnet energizes, as is usually the case in connector switches.

In order to clearly describe the operation of the connector H, certain of the bank contacts of this connector are shown, which are as follows: The bank contacts with which the wipers 96, 97 and 98 are shown in engagement are the tenth set of contacts of the second level, while the remaining bank contacts shown in connection with said wipers 96, 97 and 98, but a little above them, are the first, second, third and fourth set of bank contacts of the tenth level. Of these sets in the tenth level the first private bank contact 210 is shown grounded, while the fourth private bank contact is shown insulated. The selectors E, E′ and E² shown in Figs. 2 and 3 are of the type disclosed in said selector patent. The selector switch E is provided with a vertical magnet 127 and a rotary magnet 128, a release magnet 130 and a private magnet 129. The said private magnet 129, of course, controls the side switch wipers 131, 132, 133 and 134, the said private magnet also controls the circuit of the vertical magnet 127 in the usual manner, by means of the springs 135 and 136, and also of the release magnet 130 through the springs 135 and 137. The vertical movement of the switch-shaft, and, therefore, of the wipers 138, 139 and 140, is controlled by the vertical magnet 127, while the rotary movement is controlled by the rotary magnet 128, the rotary magnet circuit being provided with the usual interrupter springs 141. The operative magnets of the switch are, of course, controlled by the subscriber through the use of the vertical and rotary line relays 142 and 143, as is well known. Said relays have under their control the usual springs 144, 145 and 146. By means of the back-release relay 147 the release of the switch E is brought about after the side switch has passed to third position. Each selector switch in this system is provided with line and private banks. The contacts of each line bank are adapted to be engaged by corresponding line wipers such as the wipers 138 and 139, and the contacts of the private bank by the private wiper 140. The selector F is a modified form of the selector of the said selector patent. It is also of the trunk-release type, and, therefore, the line relays 148 and 149 are connected to the side switch wipers 150 and 151 only while the side switch is in first or second position. It is, of course, also provided with the vertical magnet 152 and the rotary magnet 153, the release magnet 154 and the private magnet 155. The modification is as follows: The line relays 148 and 149, as shown, control the so-called trunk-release springs 156 and 157, the former being connected with the trunk-release conductor 158 and the latter with the release magnet 154. The private magnet 155 in this switch F, unlike the selector E, is not provided with the usual spring that is connected with the release magnet. Furthermore, in this second-selector the bridge-cut-off relay and allotted springs are done away with and, therefore, the line relays 148 and 149 are connected directly to the non-grounded terminal of the battery. It will also be seen that since there is no use for normal conductors, such as the normal conductors 261, 262 and 263 allotted to the selector $E^2$ (Fig. 3), or such as the conductors 343, 344 and 246 allotted to the selector E (Fig. 2), these conductors are omitted. The usual shaft wipers 159, 160 and 161 are provided for engaging the bank contacts.

The connector switch I may also be of any suitable or approved type, and, as shown, is of the type described in said connector patent. The connector switch shaft (not shown), like the first-selector switch shaft, carries the wipers 162, 163 and 164. The connector-switch is also controlled by the calling subscriber through the medium of the vertical and rotary line relays 165 and 166. The vertical line relay 165 directly controls the vertical magnet 167 and also the rotary magnet 168. The purpose of the vertical magnet 167 is to give the shaft and shaft wipers their vertical motion, and the rotary magnet 168 imparts to the shaft and shaft wipers a rotary or circular motion. The rotary line relay 166 controls the private magnet 169 which, under certain conditions, in turn controls the vertical and rotary magnets 167 and 168, release magnet 170, and also the side switch wipers 171, 172, 173 and 174. The side switch of the connector, like the side switch of the first-selector, has a normal or first position, a second position and a third position. To release magnet 170 is also controlled by the vertical and rotary line relays 165 and 166 acting conjointly. This magnet 170 may also be energized through the medium of the back-bridge relays 175 and 176 by the called subscriber if the calling subscriber does not bring about the release of the connector switch. The ringer relay 177, as usual, provides the means whereby the ringer generator M may be bridged across the line of the called substation. The central station or exchange is equipped with busy-signaling apparatus of any suitable design, comprising an interrupter in series with the primary winding of an induction-coil, as shown at N, whereby a busy-signaling current is induced in the secondary winding 178 of the said coil.

The repeater J comprises the vertical and rotary line relays 179 and 180, a switching relay 181, by means of which the incoming conductors to the repeater are extended to the condensers 182 and 183 when the repeater conductors are seized by a calling second-selector switch. The relay 184, upon energizing, operates to establish a guarding potential at the second-selector banks to protect the repeater from being seized when the trunk-line to which the repeater J is allotted is engaged by a subscriber calling into the main exchange from the branch exchange.

A clearer understanding of the operation of my improved system may be obtained by considering its action when one subscriber calls another. Assume, for example, that the subscriber at substation A (Fig. 1) desires to call some subscriber at substation $A^3$, #2220 (Fig. 3), which is allotted to the main exchange represented in Fig. 2. Since the trunk-lines from the sub-central office to the main-central office are, in this case, arranged to lead off from the tenth level of the connector bank, then when a main exchange connection is desired by a sub-exchange subscriber the subscriber must first call naught on his dial. To call naught the subscriber at substation A operates the calling device in the well-known manner corresponding to the digit naught. The preliminary impulse for operating the line switch C occurs when the calling subscriber pulls down the dial, whereby the rotary impulse spring 24 is momentarily pressed against the ground post 20. As a result, the trip magnet 47 of the line switch C is energized by a flow of current from ground $G^{15}$ through the springs 18 and 19, ground post 20, rotary impulse spring 24 to the rotary line conductor 32, conductor 185 (Fig. 4), bridge-cut-off relay springs 186 and 187 to the trip magnet 47, thence through the said magnet to the conductor 188, differential relay springs 189 and 88, motor magnet springs 85 and 86, motor magnet 71 to the battery lead 190, thence through battery B to ground G. As soon as the trip magnet 47 energizes, the armature 51 is attracted and the plunger 44 is liberated and thrust into the terminal Q by a spring 58. When the plunger 44 engages the bank terminal Q an energizing circuit is closed through the motor magnet relay 73, which in turn operates to close a circuit through the motor magnet 71. The motor magnet operates to place the idle plungers opposite the first idle bank terminal similar to the terminal Q. The circuit through the relay 73 extends from ground $G^2$ through the winding 191 of the relay 73, segment 74, wiper arm 75, contact 84, conductor 192, bank springs 70 and 69, through the release magnet 48 to the battery lead 190, thence through battery B to ground G. Although this circuit includes the release magnet 48, the said magnet does not operatively energize, since the relay 73 is wound to a high resistance, while the release magnet is wound to a comparatively low resistance. The relay 73, upon energizing operates to close the springs 88 and 87 in contact, whereby a circuit is completed through the motor magnet 71 extending from ground $G^3$ through the springs 87 and 88, springs 85 and 86, motor magnet 71 to the battery lead 190, thence through battery B to ground G. The motor magnet 71, upon energizing, attracts its armature 81, whereby the pawl 82 engages the ratchet wheel 72 and rotates the said wheel one step. When the armature 81 is attracted against the magnet cores the springs 85 and 86 disengage, thereby breaking the energizing circuit through the motor magnet. The cam-arm 76, being in engagement with the pin 77, is operated to advance the plunger shaft 60, and consequently all idle plungers that may be in normal locked position, one step and opposite another bank terminal similar to the bank terminal Q. Also, the wiper 75 is carried from the contact point 84, which corresponds to the terminal Q, to the contact point 89, which latter corresponds to the terminal before which the advanced idle plungers are now resting.

At the instant that the plunger 44 enters the bank terminal Q the following springs are pressed into contact: 63 and 64, 65 and 66, 67 and 68, and 69 and 70. The engagement of the springs 67 and 68 establishes a circuit from ground $G^4$ by way of the normal conductor 95 to the connector private bank contacts that correspond to the line that terminates in the line switch C, whereby a guarding potential is established to prevent any subscriber from calling the said line after the calling subscriber at substation A operates his dial preparatory to making a call, as explained. The circuit over which the said guarding potential is established extends from ground $G^4$ through the bank springs 68 and 67 to the private normal conductor 95, thence to the connector private bank. The engagement of the springs 67 and 68 also closes a circuit through the bridge-cut-off relay 46 extending from ground $G^4$ through the springs 68 and 67, conductor 193, through the relay 46 to the battery lead 190, thence through battery B to ground G. The said relay, upon energizing, breaks the contact between the springs 187, 186 and 194, whereby the vertical and rotary line conductors 31 and 32 are disconnected from the trip magnet 47. The closure of connection between the springs 69 and 70 establishes a guarding potential at the master switch bank contact 84 over the following circuit: from battery B to the battery lead 190, thence through the release magnet 48 and springs 69 and 70, conductor 192 to the said contact point 84. It will be understood that the bank terminal Q, being the first bank terminal of the line switch bank, corresponds to the first segment 84 of the master switch bank O. This guarding potential protects the seized trunk conductors 90, 91 and 92 from being seized by other plungers. Suppose that the master switch has operated and carried the wiper 75 to the last contact point 117. Now, when the motor magnet 71 operates for the next step—that is, when another subscriber calls—the wiper 75 passes out of contact with the contact point 117 and into engagement with the contact point 84, upon which latter there is a guarding potential. This guarding potential operates to again energize the differential relay 73, which in turn operates to again close the energizing circuit for the motor magnet 71. The current through the said relay flows from the said contact 84 through the wiper 75 to the common segment 74, through the winding 191 of the differential relay 73 to ground $G^2$. When the differential relay 73 attracts its armature the differential relay springs 87 and 88 are pressed into contact, thereby closing an energizing circuit for the motor magnet 71 from ground $G^3$ through the said springs 87 and 88, through the springs 85 and 86, motor magnet 71, thence to the battery lead 190, and through battery B to ground G. The motor magnet then operates, as previously explained, to rotate the ratchet wheel 72 one step for advancing the plunger shaft 60 one step, and the master switch wiper 75 one step also, and into engagement with the second segment 89. When thus advanced one step the plunger shaft 60 carries all idle plungers that are in locked engagement with the said plunger shaft opposite the next bank terminal, as explained. If there should be a guarding potential at the bank segment 89 of the master switch bank the differential relay 73 will remain energized, whereby the energizing circuit through the motor magnet 71 is again completed when the motor magnet springs 85 and 86 again engage; and as a result the motor magnet 71 is again operated, whereby the plunger shaft 60 and master switch wiper 75 are advanced another step. This operation continues as long as the wiper 75 continues to find segments with guarding potentials. As soon as an idle segment is found, however, the energizing circuit through the differential relay 73 is broken, at which time the said relay in turn breaks the energizing circuit for the motor magnet 71 until the next subscriber makes a call. The closure of connection between the springs 63 and 64 extends the calling subscriber's vertical conductor 31 to the vertical trunk conductor 90, which latter leads to the connector vertical line relay 99. The closure of contact between the springs 65 and 66 extends the subscriber's rotary line conductor 32 to the rotary trunk conductor 91, which latter leads to the connector rotary line relay 100.

The subscriber at substation A has thus established connection with the connector H, and now as the dial returns toward normal position, grounding the vertical line conductor 31 each time that the impulse spring 23 is pressed onto the ground post 20, the vertical line relay 99 of the connector H is energized by a flow of current from the substation ground $G^{15}$, and immediately before the dial stops the impulse to the rotary line conductor 32 energizes the connector rotary line relay 100 also. The circuit through the vertical line relay 99 extends from ground $G^{15}$ through the springs 18 and 19 to the ground post 20, thence through the impulse spring 23 to the vertical line conductor 31, line switch bank springs 63 and 64, vertical trunk line conductor 90, vertical line relay 99 to the battery lead 190, thence through battery B to ground G. Each time that the vertical line relay 99 energizes, the relay spring 196 is pressed onto the ground spring 197. The vertical magnet is thereby energized, and the wipers 96, 97 and 98 of the connector are raised one step at a time to the tenth bank level and brought opposite the first contact of the said level. The energizing circuit of the said magnet extends from ground $G^5$ through the springs 197 and 196 to the conductor 198, switching relay springs 199 and 200, private magnet springs 201 and 202, side switch wiper 107, contact point 203, through the vertical magnet 101, thence to battery lead 190, and through battery B to ground G. On the tenth step the arm 204 upon the end of the shaft presses the springs 123 and 124 into engagement. As previously explained, when the shaft is raised to the tenth level the connector acquires the rotary or automatic selective feature of the selector. Therefore, when the rotary impulse energizes the rotary line relay 100, and as a result the private magnet is in turn energized to cause the side switch to pass to second position, the connector shaft is automatically rotated. The energizing circuit through the line relay extends from ground $G^{15}$ through the springs 18 and 19, ground post 20, rotary impulse spring 24 to the rotary line conductor 32, line switch bank springs 65 and 66, trunk conductor 91, rotary line relay 100 to the battery lead 190, thence through battery B to ground G. The rotary line relay, upon energizing, operates to place the springs 207 and 197 in contact, whereby an energizing circuit is closed through the private magnet 103. This circuit extends from ground $G^5$ through the springs 197 and 207, switching relay springs 208 and 209, then through the private magnet 103 to the battery lead 190, and through battery B to ground G. The private magnet energizes and permits the side switch to pass to second position. As shown in Fig. 1, the first private contact 210 of the tenth level is grounded. This provision is made in order that the private magnet may be energized at the first rotary step and the side switch tripped to third position as soon as an idle trunk-line is found. If the first set of contacts allotted to the trunk-line is busy the shaft is automatically rotated onto the next set of contacts; also, if the second set of contacts leading to the main exchange is busy the connector shaft wipers are rotated to the next trunk-line. This automatic rotation is brought about as follows: On the tenth vertical impulse, when the normal arm 204 presses the springs 123 and 124 into contact, an energizing circuit is established through the relay 125 which, upon energizing, operates to press the springs 211 and 212 into contact and to carry the spring 213 from the spring 214 to the spring 215, whereby a new energizing circuit is established through the private magnet 103, said circuit extending from the grounded private bank contact 210 to the shaft wiper 98, side switch wiper 108, contact point 216, through the springs 213 and 215, then through the winding of the private magnet 103, and through battery B to ground G.

When the springs 211 and 212 are pressed into contact, and the side switch passes to second position, an energizing circuit is closed through the rotary magnet 102, extending from ground $G^6$ through the interrupter 126, springs 211 and 212, contact point 217, side switch wiper 109, through the rotary magnet 102 to the battery lead 190, thence through battery B to ground G. The rotary magnet operates to carry the shaft wipers 96, 97 and 98 onto the first set of contacts of the tenth level, and when the shaft wiper 98 engages the grounded contact point 210 the said private magnet is maintained energized, and the side switch is retained in second position as long as the wiper 98 engages a busy or grounded contact. This energizing circuit through the rotary magnet 102 is maintained, and when an idle contact is found the energizing circuit through the private magnet becomes broken and the side switch passes to third position, whereby the energizing circuit through the rotary magnet becomes broken when the side switch wiper 109 leaves the contact point 217. If the first and second sets of contacts allotted to the trunk-lines are busy, the energizing circuit through the private magnet is maintained until the private wiper is rotated onto the insulated contact, when the private magnet is released. The side switch is thus tripped to third position, the rotary magnet circuit broken and the calling subscriber connected to the busy signaling current. If the first set of contacts allotted to the trunk-lines is not in use, there is no guarding potential at the private wiper 98 to lock and hold the private magnet when the rotary impulse begins, and therefore the side switch passes to third position. At the instant that the side switch passes to third position, the connector side switch wipers 105 and 106 having engaged the contact points 218 and 219, the calling subscriber's line conductors are extended into connection with the normal conductors 220 and 221, which latter lead to the line switch $C^2$ allotted to the trunk-line conductors 222 and 223. Furthermore, when the side switch passes to third position a guarding potential is established for protecting the called line. This guarding potential extends from ground $G^7$ to the contact point 224, side switch wiper 108, and shaft wiper 98, which latter engages the private contact of the called trunk-line. The energizing circuit through the cut-off relay 225 extends from ground $G^7$ to the private wiper 98, as explained, through the conductor 226, cut-off relay 225 to the battery lead 190, thence through battery B to ground G. The said relay, upon energizing, operates to separate the springs shown in contact in Fig. 1, and to carry the spring 227 into engagement with the spring 228, whereby the vertical normal conductor 220 is extended to the vertical trunk-line conductor 222. Furthermore, when the side switch wiper 109 passes to third position an energizing circuit is closed through the switching relay 113. This circuit extends from ground through the normal springs 123 and 124, winding of the switching relay 113, side switch wiper 109, through the winding of the rotary magnet 102 to the battery lead 190, thence through battery B to ground G. Although this circuit includes the rotary magnet 102 the said magnet does not operatively energize, since the relay 113 is wound to a high resistance, while the resistance of the rotary magnet 102 is comparatively low. The relay 113, upon energizing, operates to shift the springs 199 and 208 from the springs 200 and 209 to the springs 229 and 230, whereby the vertical and rotary line relay springs 196 and 207 are connected with the shaft wipers 96 and 97, respectively. Hence, when the connector vertical and rotary line relays 99 and 100 are energized, the said relays operate to deliver or repeat impulses to the line conductors engaged by the shaft wipers 96 and 97. The subscriber's line conductors 31 and 32 being thus extended to the trunk-line conductors 222 and 223, respectively, which terminate in the first-selector switch E of the main or central exchange, the subscriber at substation A is now ready to call any subscriber of the main exchange and, therefore, the subscriber at substation $A^3$ to which, as stated, is allotted the line #2220 (Fig. 3). Now, to call the number 2220 the dial is turned for each digit, as a result grounding the vertical line conductor 31 a certain number of times and the rotary line conductor 32 once.

It will be understood that each time the dial is turned for a digit a preliminary impulse is given the rotary line conductor, as explained; but the grounding of the rotary line conductor by this preliminary impulse is without effect at this particular time. The preliminary impulse is effective only when the dial is turned the first time. The first digit being 2 the subscriber at substation A operates the dial accordingly, and the spring 23 is thereby pressed onto the ground post 20 twice. As a result, the vertical line relay of the connector H is energized twice by a flow of current from ground $G^{15}$, as previously traced. The connector vertical line relay, upon energizing, operates to press the springs 197 and 196 into contact, whereby the ground impulses are repeated to the vertical trunk conductor 222 for energizing the vertical line relay 142 of the first-selector E. This energizing circuit extends from ground $G^5$ through the connector relay springs 197 and 196, conductor 198, switching relay springs 199 and 229, side switch wiper 105, shaft wiper 96 to the normal conductor 220, cut-off relay springs 228 and 227 of the line switch $C^2$ to the vertical trunk-line conductor 222, through the side switch wiper 131, contact point 231 to the vertical line relay 142, through the springs of the bridge-cut-off relay 232 to the battery lead 233, thence through battery B′ to ground G′. Each time that the vertical line relay 142 energizes, the line relay spring 145 is pressed onto the ground spring 144. The vertical magnet 127 is thereby energized and the wipers 138, 139 and 140 of the selector E are raised to the second bank level and brought opposite the first contact of said level. The energizing circuit for the said vertical magnet 127 extends from ground $G^8$ through the springs 144 and 145, private springs 135 and 136, and through the vertical magnet 127 to battery B′ and to ground G′. Following the vertical impulses, the rotary impulse spring 24 is then pressed onto the ground post 20, grounding the rotary line conductor 32 and energizing, therefore, the rotary line relay 100 of the connector H over a circuit previously traced. The rotary line relay 100 of the connector in turn operates to place the springs 207 and 197 in contact, whereby the impulse is repeated to the rotary trunk-line conductor 223, and then to the first-selector rotary line relay 143, over a circuit extending from ground $G^5$ through the springs 197 and 207,

BEST AVAILABLE COPY switching relay springs 208 and 230, side switch wiper 106, shaft wiper 97, conductor 221, rotary trunk-line conductor 223, side switch wiper 132, contact point 234, rotary line relay 143, through the springs of the cut-off relay 232 to the battery lead 233, thence through battery B′ to ground G′. The rotary line relay, upon energizing, presses the line relay spring 146 onto the ground spring 144, thereby establishing a circuit through the private magnet 129 from ground $G^8$ through the springs 144 and 146 to the private magnet 129, and through the said magnet to battery lead 233, thence through battery B′ to ground G′. The private magnet, upon energizing and deënergizing, permits the selector side switch to pass from first to second position, permitting the side switch wipers 133 and 134 to engage the contact points 235 and 236, respectively.

The closure of connection between the side switch wiper 133 and the contact point 235 sets up an energizing circuit for the rotary magnet 128 from ground $G^9$ to the contact point 235, through the side switch wiper 133, interrupter springs 141, rotary magnet 128 to the battery lead 233, and then through battery B′ to ground G′. The said rotary magnet 128 then operates to rotate the wipers 138, 139 and 140 of the selector E into engagement with the first trunk-terminal of the second level of the selector E, from which terminal, it is assumed, the trunk-line conductors 237, 238 and 158 lead to the second-selector F. If the first trunk is busy, however, the first private bank contact will be found grounded, and then as soon as the private wiper 140 engages the first grounded private bank contact point, the private magnet 129 energizes again, locking the side switch in second position. The energizing circuit for said private magnet extends from the grounded terminal G′ of battery B′ through an occupying switch (not shown) to the private wiper 140, thence through the back-release relay 147 to the side switch wiper 134, contact point 236, private magnet 129, thence through said magnet to the battery lead 233, and through battery B′ to ground G′. The private magnet 129, upon thus becoming energized, locks the side switch wiper 133 in engagement with the contact point 235, whereby the rotary magnet 128 will be energized step by step until the wipers are carried beyond the last busy trunk-line, if, for example, not only the first, but also the second, or still other trunk-lines are busy. At the instant that the private wiper leaves the last busy contact point, the energizing circuit through the private magnet 129 is destroyed, and as a result the selector side switch passes to third position. If, however, there are no busy trunk-lines, the rotary magnet 128 releases the side switch to third position as soon as the wipers are carried into engagement with the first trunk-line. As soon as the side switch passes to third position, as stated, the subscriber's line conductors 31 and 32 are extended to the conductors 237 and 238 which, in this case, it is assumed lead to the selector switch F. The extension of the line occurs, of course, as soon as the side switch wipers 131 and 132 engage the contact points 240 and 241, respectively. Not only is the subscriber's line thus extended, but a guarding potential is established at the private wiper 140, when the side switch wiper 134 passes onto the ground contact point 242, for protecting the seized trunk-line from interference by other calling subscribers. This guarding potential is established from ground $G^{10}$ to the contact point 242, thence through the side switch wiper 134 and through the back release relay 147 to the private wiper 140. Furthermore, when the selector shaft is given the first vertical step the normal arm 243 permits the springs 244 and 245 to engage, whereby an energizing circuit is established through the relay 184 of the repeater J, which relay in turn operates to establish a guarding potential at the second-selector bank to protect the repeater J from being seized by a second-selector, thus preventing any subscriber from calling out on the trunk-line conductors 222 and 223, through the repeater J, while the said conductors are being used by an incoming call. The circuit through the relay 184 extends from ground $G^{11}$ through the springs 245 and 244, conductor 246, springs 247 and 248, through the winding of the relay 184 to the battery lead 233, thence through battery B′ to ground G′. The relay 184, upon energizing, operates to place the springs 249 and 250 in contact, thus establishing a guarding potential at the second-selector private banks extending from ground $G^{12}$ through the springs 249 and 250, conductor 251, thence to the private bank contact 252, thus protecting the trunk-line against seizure at the main central exchange while seized at the sub-central exchan , as explained.

It will be seen, of course, that the energizing circuit for the rotary magnet 128 (to which reference has already been made) is destroyed when the idle trunk-line is seized—that is, when the side switch wiper 133 leaves the contact point 235. The second digit of the number called being 2, the calling subscriber again operates his dial accordingly, as a result grounding the vertical line conductor 31 when the spring 23 meets the ground post 20. Since the line conductors 31 and 32 have been extended to the conductors 237 and 238 (Fig. 2) which lead to the selector F, the vertical and rotary line relays of the connector H, upon energizing for the second digit, operate to repeat the second digit impulses to the selector switch F in the same manner as the first digit impulses were repeated to the selector switch E. The vertical line relay 148 of the selector F is, therefore, energized twice by a flow of current from ground $G^5$ at the connector H to the vertical trunk-line conductor 222, as explained, thence to the side switch wiper 231 of the selector E, contact point 240, vertical line shaft wiper 138, vertical trunk conductor 237, side switch wiper 150, contact point 253, vertical line relay 148 to the battery lead 233, thence through battery B′ to ground G′—that is, when the vertical line conductor 31 is grounded for the second digit the vertical line relay 148 operates to close a circuit through the vertical magnet 152, which in turn operates to carry the shaft wipers along step by step and bring them opposite the bank terminals of the second level, as explained in connection with the selector E. When the rotary line conductor 32 is grounded after the vertical impulses, the rotary line relay 149 of the second-selector F is then, in order, energized by the repeated impulse from the connector H, whereby an energizing circuit is in turn established through the private magnet 155, which private magnet then operates to release the side switch of the selector F, as described in connection with the selector E. This selector then performs the usual trunk-selecting operation, as before described in connection with selector E; and after the switch F comes to rest the shaft wipers 159 and 160 will be found in engagement with the trunk conductors 254 and 255, respectively, which lead to the connector switch I. At the same time the private wiper 161 establishes a protecting potential at the private contact 256 for guarding the seized trunk-line. When the side switch wipers 150 and 151 engage the contact points 257 and 258 the calling subscriber's line conductors 31 and 32 are still farther extended to the connector switch I. The ground impulses from the substation to the line conductors for the last two digits, namely two and naught, are effective in operating the connector I. For the third digit 2 the vertical impulse spring 23 is pressed onto the ground post 20 twice, whereby an energizing circuit is each time closed through the connector vertical line relay 165. The impulses are each time repeated by the vertical line relay of the connector H to the vertical line relay of the connector I, in the same manner in which the impulses are repeated to the selectors E and F. Each time that the vertical line relay 165 of the connector I is energized the line relay springs 259 and 260 are pressed into contact, thereby closing an energizing circuit each time through the vertical magnet 167, which latter operates in the usual manner, one step at a time. The shaft wipers 162 and 163 are, therefore, raised two steps and brought opposite the level in which are located the terminals of the normal conductors 261, 262 and 263 that lead to the first-selector switch $E^2$ allotted to the line of the called substation. The normal conductors 261 and 262, however, are connected with the line conductors 264 and 265 which lead to the substation $A^3$. After the connector shaft has been raised by the vertical impulses the rotary impulse is sent in. This is done when the rotary impulse spring 24 makes contact with the ground post 20, thereby closing an energizing circuit through the rotary line relay 100 of the connector H, and the impulse is in turn repeated to the rotary line relay 166 of the connector I.

The rotary line relay 166, upon energizing, closes an energizing circuit through the private magnet 169, which in turn operates to release the connector side switch from first to second position. The last digit being naught, the calling device is operated as previously described, grounding the vertical conductor 31 ten times and the rotary line conductor 32 once. The vertical and rotary line relays 165 and 166 are operated as before. However, when the line relay springs 259 and 260 engage, a circuit is closed through the rotary magnet 168, instead of through the vertical magnet 167. Each time that the rotary magnet is energized it operates to rotate the shaft and shaft wipers 162, 163 and 164 one step at a time until the said wipers are carried into engagement with the conductors 261, 262 and 263 which are allotted to the line of substation $A^3$. The energizing of the rotary line relay 166, as previously stated, completes an energizing circuit through the private magnet 169, which now operates with one of two results, namely the release of the side switch from second to third position thus placing the side switch wipers 171, 172, 173 and 174 in contact with their respective contact points of the third position, or the so-called busy-release of the connector. It will first be assumed that the first result occurs—that is, that the side switch passes to third position. When the side switch wiper 174 engages the contact point 266 a ground potential is established at the connector bank. The said guarding potential also provides an energizing circuit for the bridge-cut-off relay 267 of the first-selector $E^2$, thereby removing the bridge formed by the vertical and rotary line relays of the first-selector $E^2$.

To signal the called subscriber the calling subscriber presses the signaling button 37, placing the spring 35 in contact with the substation ground $G^{15}$, thereby energizing the vertical line relay 99 of the connector H, and in turn the vertical line relay 165 of the connector I. The path of the energizing circuit for the relay 99 of the connector H extends from ground $G^{15}$ through the springs 18 and 19 to the contact point 38, spring 37, springs 33 and 34 to the vertical line conductor 31, trunk conductor 90, vertical relay 99 to the battery lead 190, thence through battery B to ground G. This relay, upon energizing, repeats the impulse to the vertical line relay 165 of the connector I. It will be remembered that the connector side switch has passed to third position, and that the side switch wiper 173 is in engagement with the contact point 268, thereby placing the vertical line relay 165 in control of the ringer relay 177 in the same manner in which the rotary magnet 168 came under the control of the vertical line relay 165 when the side switch passed from first to second position. Therefore, when the vertical line relay 165 presses the springs 259 and 260 into contact the ringer relay 177 is energized by a flow of current from ground to the relay springs 259 and 260, through the private magnet springs, side switch wiper 173, contact point 268 to the ringer relay 177 and to the battery lead 233, thence to battery B′ to ground G′. The ringer relay, upon energizing, shifts the springs 269 and 270 from the springs 271 and 272, respectively, and onto the springs 273 and 274, respectively. This results in separating the calling subscriber's line from the called subscriber's line, and in bridging across the line of the latter the terminals of the ringer generator M. A signaling current is, therefore, sent from the generator M to the ringer relay springs 273 and 269, side switch wiper 172, connector shaft wiper 163, normal conductor 262, line conductor 265, condenser 275, ringer 276, spring 277, switch-hook 278 to the vertical line conductor 264, normal conductor 261, connector shaft wiper 162, side switch wiper 171, ringer relay springs 270 and 274 back to the generator M.

As soon as the calling subscriber ceases to press the signaling button 37 the ringer relay 177 becomes deënergized, and the springs 269 and 270 resume their normal position in contact with the springs 271 and 272, respectively. In response to the signal the subscriber $A^3$ removes the receiver 279 from the switch-hook 278, thereby removing the ringer 276 from across his line and bridging instead the secondary circuit which includes the receiver 279, secondary winding 280 of the induction-coil 281 and secondary springs 282 and 283. The local transmitter circuit is closed as soon as the springs 284 and 285 engage in contact. The two substations A and $A^3$ are now connected over the circuit shown by heavy lines in Figs. 1, 2 and 3, namely: The conductors 264 and 265 of the called line, the normal conductors 261 and 262, condensers 364 and 365, wipers 159 and 160, side switch wipers 150 and 151, conductors 237 and 238, wipers 138 and 139, side switch wipers 131 and 132, trunk conductors 222 and 223, conductors 220 and 221, wipers 96 and 97 of the connector H, side switch wipers 105 and 106, condensers 110 and 111, conductors 90 and 91, bank springs 64 and 63 on one side and 66 and 65 on the other, and the conductors 31 and 32 of the calling line. The release of the central office switching apparatus occurs when the calling subscriber restores the receiver 2 to the switch-hook 3, thereby pressing the release springs 7, 8 and 9 into engagement for a moment. The contact of the said release springs grounds the vertical and rotary line conductors 31 and 32 simultaneously from ground $G^{15}$ to the release spring 7, thence through the springs 8 and 9 to the vertical and rotary line conductors, thereby simultaneously energizing the vertical and rotary line relays 99 and 100 of the connector H, which relays operate to in turn ground the trunk-line conductors 222 and 223, whereby the vertical and rotary line relays 165 and 166 of the connector I are energized simultaneously, thereby placing the trunk-release springs 286 and 287 in contact and thus closing an energizing circuit including the release relay 288 of the second-selector F in series with the release magnet 170 of the connector I. The path of the circuit extends from ground $G^{13}$ to the side switch wiper 289, release relay 288, selector shaft wiper 161, connector trunk-release springs 286 and 287, release magnet 170 to the battery lead 233, thence through battery B′ to ground G′. When the connector release magnet 170 is thus supplied with current it energizes, and as a result the switch shaft and side switch are restored to normal position, thus breaking the connection between the connector switch shaft wipers 162, 163 and 164 and the normal conductors 261, 262 and 263, and, therefore, breaking the energizing circuits of the bridge-cut-off relay 267 of the selector $E^2$. The back-release relay 288 of the second-selector F, being in the same circuit with the release magnet 170, energizes simultaneously with the latter, and presses the springs 290 and 291 into engagement which in turn close an energizing circuit through the release relay 147 of the first-selector E in series with the release magnet 154 of the second-selector F. This circuit extends from ground $G^{10}$, side switch wiper 134, through the release relay 147, shaft wiper 140, springs 290 and 291, through the winding of the release magnet 154 to the battery lead 233, thence through battery B′ to ground G′. The release relay 147 energizes, and places the springs 292 and 293 in contact, whereby a circuit is closed through the first-selector release magnet 130, said circuit extending from ground through the springs 292 and 293, through the winding of the release magnet 130 to the battery lead 233, thence through battery B′ to ground G′. The vertical and rotary line relays of the connector H, upon energizing, operate to place the trunk-release springs 294 and 295 in contact, whereby an energizing circuit is closed through the release magnet 104, which latter then operates to close a circuit through the release magnet 48 of the line switch C, said circuit extending from ground through the springs 295ª and 296ª, conductor 92, bank springs 70 and 69, through the winding of the release magnet 48 to the battery lead 190, thence through battery B to ground G. All of the relays and magnets thus energized attract their respective armatures and remain energized until the substation release springs 7, 8 and 9 separate and break the ground connection with the line conductors 31 and 32, at which time they all deënergize, and the remaining unreleased switches are restored. The calling subscriber thus restores all switching apapratus which he originally brought into use. It will be evident that if the calling subscriber neglects to release the switches the called subscriber (Fig. 3) is unable to operate his switch $E^2$ as long as the connector switch I remains connected to the line #2220, on account of the cut-off relay 267 being energized. The back-release is provided in order that called subscribers may not remain helplessly tied up, so to speak, while this bridge-cut-off relay 267 is energized.

Should the called subscriber desire to make an independent call before the calling subscriber releases he may do so by first breaking the established connection and thus securing control of the first-selector $E^2$. After establishing connection between the ground springs 296 and 297 he may ground the line conductors 264 and 265 simultaneously by restoring the receiver 279 to the switch-hook 278, and thus pressing the release springs 298, 299 and 300 into engagement. As a result an energizing circuit will pass through the vertical back-bridge relay 175 and the rotary back-bridge relay 176 of the connector I. The circuit through the vertical back-bridge relay extends from the substation ground $G^{14}$ to the ground springs 296 and 297, to the springs 298 and 299, vertical conductor 264, normal conductor 261, shaft wiper 162, side switch wiper 171, ringer relay springs 270 and 272, vertical back-bridge relay 175 to the battery lead 233, thence through battery B′ to ground G′. The energizing circuit of the rotary back-bridge relay 176 extends from ground $G^{14}$, to the release springs 298, 299 and 300, to the rotary line conductor 265, normal conductor 262, shaft wiper 163, side switch wiper 172, ringer relay springs 269 and 271 and rotary back-bridge relay 176 to the battery lead 233, thence through battery B′ to ground G′. The back-bridge relays 175 and 176, upon energizing simultaneously, press the back-release springs 301 and 302 into contact which completes an energizing circuit to the release magnet 170 from ground to the springs 301 and 302, through the release magnet 170, battery lead 233, thence through battery B′ to ground G′. The release magnet is energized and the switch shaft wipers 162, 163 and 164 and side switch are restored to normal position. The energizing circuit through the bridge-cut-off relay 267 is broken when the shaft wiper 164 leaves the private bank contact. The connector switch I is thus released and the first-selector $E^2$ is restored to the control of the substation #2220. By grounding the line conductors 31 and 32 the subscriber A may restore the remaining switches.

In the preceding it has been explained that when the last rotary impulse comes in the connector switch is liable to be released, or the side switch may pass to the third position, depending upon the condition of the circuits. It was first assumed that the side switch had passed to third position, and the explanation was made accordingly. It will now be assumed that the called line is busy for any reason whatever and, therefore, that the private bank contact allotted to the line #2220 is grounded. This being the case, it will be explained how the busy-release of the conductor follows at the instant that the rotary line relay 166 is energized by the aforesaid rotary impulse. The said relay 166, upon energizing, energizes the private magnet 169, as previously described, which latter in turn presses the springs 303 and 304 into contact. As soon as the said springs 303 and 304 engage, the release magnet 170 is placed in connection with the private wiper 164 (since the side switch wiper 174 is now in second position), which wiper 164 has been previously rotated onto a grounded contact. As a result, a flow of current is sent through the release magnet 170 from the grounded private wiper 164 to the side switch wiper 174, through the private magnet springs 303 and 304, to the release magnet 170 and to battery lead 233, thence through battery B′ to ground G′. The release magnet 170, upon energizing, releases the connector switch shaft and restores the connector side switch to its first position, returning the vertical magnet 167 to the control of the vertical relay 165. Therefore, if the calling subscriber (Fig. 1) presses the signaling button 37 and grounds the vertical line conductor 31, he operates the vertical line relay 165, which latter in turn operates the vertical magnet 167. The vertical magnet armature raises the switch shaft so that the normal post arm 305 permits the switch shaft spring 306 to come into contact with the contact 307, and the busy-signaling current is sent from the busy-signaling machine N to the calling subscriber's station. Upon hearing the busy-signal the calling subscriber will understand that the desired line is in service and will release the switching apparatus, over the same circuits previously described, by hanging up his receiver.

It will be understood, of course, that the ground at the private bank contact that causes the busy-release of the connector is due to the fact that the called line may be either calling or has been called. In the former case the ground connection is closed by the selector $E^2$, to the extent that the shaft, upon rising, permits the shaft springs 366 and 367 to come into contact. In the latter case—that is, if the called subscriber has been called—the ground is supplied by the connector that has made the call in the same manner that has already been explained in connection with the connector I.

The explanation that has preceded in reference to the call between the subscriber A (Fig. 1) and the subscriber $A^3$ (Fig. 3) refers to a case, as has already been stated, when a subscriber of the exchange indicated in Fig. 1 calls the subscriber of the exchange indicated in Fig. 2, as, for example, where the subscriber A is the subscriber of a private branch exchange and the subscriber $A^3$ is a subscriber of the main exchange, the two exchanges being connected by suitable trunk-lines which, in this case, as has been explained, lead off from the tenth level of the connector switch H. It has already been explained that if any subscriber of the private branch sub-exchange (Fig. 1) wishes to call any other subscriber of the same exchange, he may do so by using the connector H, which connector in that case picks out the desired line in some level other than the tenth level. This specific arrangement, however, it will be seen, is not esesntial. To illustrate: When the subscriber at substation A calls a subscriber of the same local sub-central exchange as the subscriber at substation A′ on the line #20, for example, the connector H operates in the usual manner—that is, the subscriber controls both the vertical and rotary movements of the switch shaft. To call the number 20 the subscriber at substation A turns the dial for the first digit 2, whereby the trip magnet 47 of the line switch C is energized and operated, as previously explained, to seize an idle trunk-line leading to a connector switch H. On the return motion of the dial the vertical line conductor 31 is grounded twice, thus energizing the vertical line relay 99 twice over circuits already shown. The vertical line relay in turn closes an energizing circuit through the vertical magnet 101, whereby the shaft wipers 96, 97 and 98 are carried two steps in a vertical direction and brought opposite the bank level in which are located the terminals of the line #20. Following the vertical impulses the rotary impulse energizes the rotary line relay 100, which in turn operates, as before, to energize the private magnet 103, whereby the side switch may be placed in second position. Now, when the vertical line relay 99 operates for the last digit naught, an energizing circuit is closed through the rotary magnet 102 extending from ground $G^5$ through the springs 197 and 196, switching relay springs 199 and 200, private magnet springs 201 and 202, side switch wiper 107, contact point 309, and through the magnet 102 to the battery lead 190, thence through battery B to ground G. The vertical relay 99 being energized ten times, the rotary magnet is in turn energized ten times, and the shaft wipers 96, 97 and 98 are carried into engagement with the bank contacts that constitute the terminals of the line #20. When the private magnet 103 is energized by the rotary line relay 100 for the last digit, one of two results occurs, namely the release of the side switch from second to third position, or the so-called busy-release of the connector switch if the desired line is busy. It will be assumed that the first result occurs—that is, that the side switch passes to third position. As a result, the side switch wiper 108 engages the contact point 224, a guarding potential is established at the connector bank to protect the called line, and an energizing circuit is closed through the cut-off relay 310 of the line switch C′. This circuit extends from ground $G^7$ through the side switch wiper 108 to the shaft wiper 98, conductor 311, through the cut-off relay 310 to the battery lead 190, thence through battery B to ground G. The cut-off relay, upon energizing, places the springs 312 and 313 in contact, whereby the vertical normal conductor 314 is connected with the vertical line conductor 368. The rotary line conductor 315 is connected with the rotary normal conductor 316.

To signal the called subscriber the subscriber at substation A presses the signaling button 37, whereby the vertical line relay 99 is again energized. Since the side switch has passed to third position the vertical line relay, upon energizing, operates to close a circuit through the ringer relay 112. This circuit extends from ground $G^5$ through the springs 197 and 196, switching relay springs 199 and 200, private magnet springs 201 and 202, side switch wiper 107, contact point 317, through the ringer relay 112 to the battery lead 190, thence through battery B to ground G. The ringer relay, upon energizing, operates, as explained in connection with the ringer relay of the connector I, to bridge the ringer generator K across the terminals of the called line for operating the substation ringer 318. The subscriber at substation A′, in response to the signal, removes the receiver from the switch-hook. The two substations A and A′ being connected over the circuit shown by heavy line conductors in Fig. 1, conversation may be carried on. The release of the connector and line switches is brought about when the calling subscriber restores the receiver 2 to the switch-hook 3, thus grounding both line conductors 31 and 32 simultaneously and energizing the vertical and rotary line relays 99 and 100, whereby the release magnet 104 becomes energized and, as pointed out, operates to close a circuit through the release magnet 48 of the line switch C. The release magnets 48 and 104, upon energizing, attract their respective armatures and remain in readiness to restore their respective switches when the release springs 7, 8 and 9 disengage, thereby removing the ground from the line conductors 31 and 32.

The so-called busy-release of the connector follows as a result of energizing the private magnet for the last digit when the called line is busy. If the called line is busy the private wiper 98 rests on a grounded or protected contact. Now, when the private magnet 103 is energized for the last digit the ground potential at the shaft wiper is transmitted to the release magnet 104 over a circuit extending from the wiper 98 to the side switch wiper 108, contact point 216 (bearing in mind that the side switch is in second position), through the springs 213 and 214 to the private magnet spring 319 and to the spring 320, upon the energization of the private magnet, then through the release magnet 104 to the battery lead 190, thence through battery B to ground G. The release magnet 104, upon energizing, operates to close the springs 295ᵃ and 296ᵃ in contact, whereby an energizing circuit is closed through the release magnet 48 of the line switch C. Thus the release of both the connector H and the line switch C is brought about when the connector calls in on a busy line. Thinking that connection has been established the subscriber presses the signaling button 37, thus grounding the vertical line conductor 31, whereby an energizing circuit is completed through the trip magnet 47 of the line switch C from the conductor 31, through the springs 194, 186 and 187, winding of the trip magnet 47, differential relay springs 189 and 88, through the winding of the motor magnet 71 to the battery lead 190, thence through battery B to ground G. The trip magnet, upon energizing, operates as before to seize an idle trunk-line leading to a connector switch. As soon as the line switch operates, the springs 63 and 64 engage, thereby extending the ground connection of the vertical line conductor 31 to the trunk conductor 90, and then through the connector vertical line relay 99 which operates to close a circuit through the vertical magnet 101. The connector shaft is raised one step and the normal arm 204 permits the springs 121 and 122 to engage, thus connecting the busy-signaling machine L with the side switch wiper 106 which is now in first position. Upon hearing the busy-signal the calling subscriber will understand that the desired line is busy and will restore the switching apparatus by hanging up the receiver.

It has been shown how the subscriber at substation A may call and signal the subscriber A³ of the main central exchange, and also how the subscriber at substation A may call and signal a subscriber of the same local or sub-exchange. It will be pointed out how a subscriber of the main central exchange may call and signal a subscriber of the sub-central exchange (Fig. 1). As shown in Fig. 2, it will be seen that the conductors 333 and 334 leading to the repeater J lead off from the fifth level of the second-selector banks, and that the conductors 343 and 344 leading from the repeater are connected in multiple with the first-selector E to the same trunk-line, which trunk-line terminates in the private branch or sub-central exchange (Fig. 1). It will be evident that from the said fifth level of the second-selectors ten repeaters J may be reached, and, therefore, ten different trunk-lines to the exchange shown in Fig. 1. As explained, the first-selector is used when a call is made into the main exchange from the sub-central exchange; but when a call goes from the main exchange to the sub-central the repeater J is called into service instead. When the repeater J is called into service the selector E is put out of service, and when the selector E is called into service the repeater J is put out of service, in order to prevent interference. These points will be better understood after the method of making calls has been fully explained. It will also be apparent that in order to call any subscriber at the exchange shown in Fig. 1 from the main exchange, the prefix 35 must be given to every number of said exchange. For example: Assume that the subscriber at substation A² of the main exchange (Fig. 2) desires to call the subscriber at substation A′ (Fig. 1), the number of which is 20, as already stated. In that event the subscriber at substation A² must first turn his dial for the digit 3, whereby the first-selector E′ may be operated to raise its shaft wipers to the third level, and when in said level rotated into engagement with the terminals of an idle trunk-line leading to a second-selector F, for example, from which selector F the repeater J may be reached; then the dial must again be turned for the digit 5 in order to place the seized second-selector F in connection with a repeater J, for example. Then, after connection has been made with the repeater, the dial is operated for the digits two and naught. In other words, the calling subscriber must actually call the number 3520. When the dial is turned for the third digit 2 the preliminary rotary impulse operates the line switch $C^2$ of the sub-central to seize an idle connector switch, which connector is then operated by both the third digit impulses and the fourth digit impulses that follow. After the calling subscriber has established connection with the repeater J, the impulses for the last two digits are repeated by the repeater J, and the sub-central switches are operated from the main exchange in the same manner in which the central station switches were operated from the connector H when the subscriber at substation A called the subscriber at substation $A^3$. The first digit being 3 the subscriber at substation $A^2$ removes the receiver from the switch-hook and turns the dial accordingly, whereby, on the return motion of the dial, the vertical line conductor 321 is grounded three times and the rotary line conductor 322 is grounded once. Grounding the vertical line conductor 321 energizes the vertical line relay 324 of the selector E′, which in turn operates to close a circuit through the vertical magnet 325. The vertical magnet being energized three times, the shaft wipers 326, 327 and 328 are carried up three steps. Following this operation the rotary line relay 329 is energized once, and, therefore, the private magnet 330 also, whereby the side switch is permitted to pass to second position. As a result, the rotary magnet 331 is intermittently energized and the shaft wipers are rotated onto an idle trunk-line leading to a second-selector which, it will be assumed, is F. When the shaft wipers find the idle trunk the side switch passes to third position, whereby the energizing circuit for the rotary magnet is broken, a guarding potential is established at the private wiper 328 through the back-release relay 332, and the subscriber's line conductors 321 and 322 are extended to the trunk-line conductors 237 and 238 which lead to the switch F. Operating the dial for the second digit 5 operates the second-selector F, as explained, to extend the subscriber's line conductors 321 and 322 to the conductors 333 and 334 through the shaft wipers 159 and 160. When the shaft wiper 161 engages the contact point 252 an energizing circuit is closed through the switching relay 181 of the repeater J. This circuit extends from ground $G^{13}$ through the side switch wiper 289, release relay 288, shaft wiper 161, contact point 252, conductor 335, through the springs 250 and 336 of the relay 184, through the winding of the relay 181 to the battery lead 233, thence through battery B′ to ground G′. The relay 181, upon energizing, operates to shift the spring 247 from the spring 248 to the spring 337, and the springs 338 and 339 are shifted into engagement with the springs 340 and 341, respectively. When the spring 247 engages the spring 337 an energizing circuit is closed through the bridge-cut-off relay 232 of the first-selector switch E. This circuit extends from ground through the springs 337 and 247, conductor 246, normal springs 244 and 342, through the winding of the bridge-cut-off relay 232 to the battery lead 233, thence through battery B′ to ground G′. The bridge-cut-off relay, upon energizing, operates to disconnect the vertical and rotary line relays of the first-selector from each other and from battery.

The engagement of the springs 339 and 341 and 338 and 340 at the repeater J extends the conductors 333 and 334 through the condensers 182 and 183 to the conductors 343 and 344, respectively, which lead to the trunk-line conductors 222 and 223, which latter terminate in the line switch $C^2$ at the sub-exchange (Fig. 1). When the dial is turned for the last two digits the vertical and rotary line relays 179 and 180 of the repeater J are energized, and these relays in turn operate to repeat the impulses to the switches of the sub-exchange. When the dial is turned for the third digit 2 the preliminary impulse over the rotary line energizes the rotary line relay 180 of the repeater J over a circuit extending from ground at the sub-station $A^2$, over the rotary line conductor 322 to the shaft wiper 327 of the selector E′, trunk conductor 238, side switch wiper 151, shaft wiper 160 of the second-selector F, conductor 334, through the winding of the rotary line relay 180 to the battery lead 233, thence through battery B′ to ground G′. The rotary line relay, upon energizing, operates to place the springs 345 and 346 in contact, thus transmitting a ground impulse to the conductor 344, rotary trunk conductor 223, then through the springs 347 and 348 of the cut-off relay 225 at the line switch $C^2$ (Fig. 1) to the trip magnet 349, to the conductor 350, thence through the differential relay springs 189 and 88 (Fig. 4) and motor magnet 71 of the master switch D to the battery B′, in the same manner explained in connection with the operation of the line switch C. The line switch $C^2$ and the master switch D now operate, as previously pointed out, the former to extend the trunk conductors 222 and 223 to a connector switch H, and the latter to select another idle line. When the line switch $C^2$ operates a guarding potential is established at the connector bank for protecting the trunk-line against seizure by a subscriber calling out of the sub-central to the main central exchange. This guarding potential extends from ground through the bank springs 352 and 353, conductor 354 to the private bank contact 355. The trunk-line conductors 222 and 223 are thus protected against seizure both at the main exchange and at the sub-exchange. Furthermore, when the bank springs 352 and 353 engage, an energizing circuit is closed through the bridge-cut-off relay 225 of the line switch $C^2$. This relay, upon energizing, operates to carry the spring 227 out of engagement with the spring 347 and into engagement with the spring 228, and to permit the springs 347 and 348 to disengage. Also, this individual switch $C^2$, at the instant of tripping, by pressing the line bank springs 356 and 357 into contact on one side, and the springs 358 and 359 into contact on the other side, operates to extend the trunk-line conductors 222 and 223 to some connector switch, which, in this case, for the sake of simplicity, it is assumed is the connector switch H. In other words, it is assumed that the bank spring 357 of the switch $C^2$ is in multiple with the spring 64 of the line switch C (Fig. 1), and that the bank spring 359 of the line switch $C^2$ (Fig. 1) is in multiple with the bank spring 66 of the line switch C. Therefore, it is assumed that the trunk conductors 222 and 223 are extended to the trunk conductors 90 and 91 which, as already explained, terminate in the connector switch H. Following the preliminary rotary impulse, which operates to trip the line switch $C^2$, the vertical line conductor 321 is grounded twice, and the vertical line relay 179 of the repeater J is energized twice over a circuit extending from ground to the vertical line conductor 321, vertical shaft wiper 326 of the selector E′, conductor 237, side switch wiper 150, shaft wiper 159, conductor 333, through the winding of the vertical line relay 179 of the repeater to the battery lead 233, thence through battery B′ to ground G′. The vertical line relay, upon energizing, operates to place the springs 351 and 345 in contact, whereby the vertical impulses are repeated to the vertical line relay of the connector H. The path of these impulses through the connector vertical line relay 99 is from ground at the repeater J through the bank springs 356 and 357 to the vertical trunk-line conductor 90, through the vertical line relay 99 to the battery lead 190 thence through battery B to ground G. The vertical line relay 99 (see connector H, Fig. 1) is energized twice and in turn operates twice to close a circuit through the vertical magnet 101, whereby the shaft wipers are raised two steps.

Following the vertical impulses the rotary line conductor 322 is grounded once, energizing the rotary line relay 180 of the repeater J, as before, which operates to place the springs 345 and 346 in contact, whereby the impulse is repeated to the rotary line relay 100 of the connector H over the following circuit: From ground through the springs 345 and 346, conductor 344, rotary line conductor 223, bank springs 358 and 359 to the rotary trunk conductor 91 (see connector H, Fig. 1), then through the rotary line relay 100 to the battery lead 190, and through battery B to ground G. The rotary line relay energizes and in turn operates the private magnet 103, which private magnet permits the side switch to pass to second position. Now, when the dial is turned for the last digit naught the repeater vertical line relay 179 and the connector vertical line relay 99 are energized ten times, each over the previously traced circuits. When the connector vertical line relay 99 is operated the rotary magnet 102 is energized instead of the vertical magnet, and the shaft wipers are accordingly rotated ten steps onto the bank contacts of the normal conductors 314 and 316. The rotary impulse following the vertical impulse operates the private magnet 103, whereby the side switch wipers are passed to third position; and when the subscriber at substation $A^2$ presses the signaling button an energizing circuit is established through the vertical line relay, and finally through the ringer relay 112, whereby the ringer generator K is bridged across the line terminals of the called substation. After operating the switches, as explained, the two substations are connected over a circuit shown by the heavy lines from substation $A^2$ (Fig. 2) through the heavy line conductors of the first-selector switch E′ and the second-selector switch F, through the repeater conductors to the trunk-line conductors 222 and 223, through the line switch $C^2$ and connector H, line switch C′ and then to the substation A′. The release of the switching apparatus is brought about by the calling subscriber when the receiver is restored to the switch-hook and the line conductors 321 and 322 are grounded simultaneously. When the said line conductors are grounded simultaneously the repeater line relays 179 and 180 and the connector vertical and rotary line relays 99 and 100 energize simultaneously, which latter (99 and 100) close a circuit through the connector release magnet 104 which in turn operates to close a circuit through the release magnet 369 of the line switch $C^2$ by pressing the springs $295^a$ and $296^a$ into contact and bringing about the release of the sub-central switches H and $C^2$ at once, in the manner already explained. When the vertical and rotary line relays 179 and 180 of the repeater J energize, then the springs 360 and 361 are pressed into contact, and a circuit is closed through the release relay 288 of the second-selector F in series with the resistance-coil 362 of the repeater. The release relay 288 energizes and closes a circuit through the release magnet 154 in series with the release relay 332 of the first-selector E′. The release relay 332 energizes and closes a circuit through the release magnet 363 of the first-selector E′, as explained in connection with the switches E and F. These relays and magnets thus energized at the main exchange attract their respective armatures and remain energized until the ground connection to the vertical and rotary line conductors 321 and 322 is broken, at which time they all deënergize and the remaining unreleased switches are restored.

From what has preceded it should be clear that if a subscriber at substation A wishes to call the subscriber #20 of substation A′ (Fig. 1) he will do so by removing his receiver and then operating his dial with regard to the digits two and naught. Of course, as soon as the dial is pulled down for the first time the individual switch C is tripped by the preliminary impulses already described, and then as the dial goes back the vertical impulses corresponding to the digit 2 will operate to raise the wipers 96, 97 and 98 of the connector switch H two steps. Again, after the side switch has tripped to second position, the operation of the dial corresponding to the digit naught will operate the connector switch H in such a manner as to carry the said wipers 96, 97 and 98 into engagement with the normals of the line #20 which, of course, terminate in the tenth set of contacts in the second level of the bank of the connector H. The method of operation of the connector switch H and the method of ringing the desired subscriber will be the same as when the subscriber at substation $A^2$ called the subscriber at substation #20, as described in this specification.

It will be understood that the second-selectors and connectors may be employed upon the percentage basis. In other words, the number of connectors may be one-tenth of the total number of subscribers, and the number of second-selectors may be one-tenth of the total number of subscribers. A common arrangement is to divide the subscribers into divisions according to the numbers thereof, the subscribers having numbers beginning with one-thousand all belonging to one division the subscribers having numbers beginning with two-thousand all belonging to another division, and so on throughout the entire ten-thousand subscribers. This, of course, will result in ten divisions of any exchange having a capacity of ten-thousand subscribers, so that in calling any subscriber will necessarily first select one of the ten divisions. Each of these divisions is then sub-divided into ten groups—that is to say, the subscribers whose numbers terminate in one-hundred and less than two-hundred are arranged in one sub-division or group; the subscribers whose numbers terminate in two-hundred and less than three-hundred are arranged in another group, and so on, the last group being the naught-hundred. In this way a ten-thousand-subscriber exchange is divided into ten divisions, and each division is subdivided into ten sub-divisions or groups. After that, all of the subscribers whose numbers terminate in one-hundred and less than two-hundred, regardless of the thousand-group or division to which they belong, are arranged in a row or larger group; so that all subscribers whose numbers terminate in one-hundred and less than two-hundred are found in a certain row of subdivisions; all subscribers whose numbers terminate in two-hundred and less than three-hundred are found in another group or row of sub-divisions, and so on throughout the exchange. With this arrangement each group of one-hundred line or individual switches has connected to it a smaller group of first-selectors, and each bank level of such group of first-selectors has connected thereto a group of second-selectors. In a similar manner, each bank level in any particular group of second-selectors has allotted to it a group of connectors, which connectors are adapted to close connection directly with the lines of the called subscribers. Trunk-lines are provided between the first and second selectors, and between the said second-selectors and the connectors, and each trunk-line has multiple terminals, the trunking being conducted, as stated, on the well-known or common percentage basis, so that ordinarily the trunk-lines are less in number than the total number of subscribers. This, however, is well understood, is old in the art, and will require no further explanation.

From the foregoing it will be seen that I provide a system in which the subscribers of a branch exchange can call each other automatically, and can also automatically call any subscriber of the main exchange. A calling subscriber at the branch exchange always uses one of the connectors H, regardless of whether he is calling a local or a main exchange subscriber. In this way these combined rotary connectors and repeaters H are adapted to afford regular service between the subscribers of the branch exchange, and are adapted to serve also as the means for automatically selecting idle trunks to the main exchange, as well as for then repeating or relaying the electrical impulses necessary for properly controlling the selectors and ordinary connectors at the main exchange. It will be seen that at the main exchange the repeater J and the first-selector E are both permanently connected with the two-way trunk-line which extends to the branch exchange. At the main exchange it is possible for a calling subscriber thereof to automatically connect with an idle repeater, such as the repeater J, by raising the second-selector F to some particular level in which are found the terminals of the two-way trunks. With this arrangement the said terminals of the two-way trunks—that is to say, the terminals which are found in the second-selectors F—are normally disconnected from the said trunks, and their connection therewith is dependent upon the energizing of the relay 181, in the manner explained. It will also be seen that this normally open connection between the two-way trunk terminals and the two-way trunks is located between such terminals and the condensers 182 and 183, so that while these condensers are permanently connected with the said trunks, they are normally disconnected from the multiple terminals in the second-selectors F. At the branch exchange the means for repeating electrical impulses over the said two-way trunks is embodied in the connectors H, as explained, rather than in anything allotted to or individual to the said two-way trunks. As explained, therefore, my improved system embodies two-way trunks and improved means for trunking in opposite directions over the same.

What I claim as my invention is:—

1. In a telephone system, a connector switch provided with means for establishing connection with a definite and predetermined line, a group of lines, means for raising its wipers to a definite level, means for then causing said connector to automatically pick out an idle one of the group of lines, and means for then receiving impulses and transmitting or repeating these impulses to the seized line.

2. In a telephone system, a connector switch having line relays for receiving original impulses, means for then repeating these impulses in local circuits in said connector for operating the latter, a trunk circuit, and a switching relay adapted for switching connections from the local circuit to the trunk circuit, whereby the original impulses, after connection is made with the trunk circuit, may be repeated to the trunk circuit.

3. In a telephone system, a relay, a connector switch comprising means including shaft-controlled springs for energizing said relay when the shaft reaches a certain point or level above normal without releasing the switch, and switch operating means directly controlled by said relay.

4. In a telephone system, a connector switch comprising receiving relays for receiving impulses, a switch shaft with wipers, a vertical magnet for raising said shaft and wipers to any desired level, a switching relay and a transforming relay, and means including a pair of switch shaft springs whereby, after the shaft rises to a given level, said springs are brought into contact and the switching relay and the transforming relay are adapted to energize to convert the connector into a trunk selector and a repeater.

5. In a telephone system, a combined connector and selector and repeater switch comprising means for transforming the connector into a trunk selector at a given contact level of said switch, a private circuit comprising a private wiper, a group of private bank contacts corresponding to said level, the first private bank contact being permanently grounded, the last of said group of private bank contacts being permanently insulated, and a busy circuit adapted to be established for signaling.

6. In a telephone system, the combination of a trunk-line, a trunk-selecting switch at one end thereof, and a first-selector and a repeater normally in multiple at the other end thereof.

7. In a telephone system, a repeater normally in multiple with a trunk selector, means whereby, when the repeater is in use, the selector is then rendered inoperative, and whereby, when the selector is in use, the repeater is then rendered inoperative.

8. In a telephone system, a first selector, a second selector, a repeater adapted to be seized by said second selector, having a switching relay, a second relay, and means for energizing said second relay when the first selector is brought into operation to break the energizing circuit of the switching relay, and put a guarding potential at the private bank contact of the second selector to prevent the repeater from being seized by any second-selector.

9. In a telephone system, means for establishing a talking circuit, said means including a first selector including a bridge-cut-off relay, a second selector and a repeater, a pair of condensers in the talking circuit, a cut-off relay and an energizing circuit for the same, and a switching relay for said repeater adapted to be energized by said second selector to destroy the energizing circuit of the cut-off relay, and to energize the bridge-cut-off relay of the first selector, and also to complete the talking circuit through said pair of condensers.

10. A telephone system comprising an automatic connector adapted for finding called subscribers' lines and automatically selecting idle trunks, and having means for repeating electrical impulses over any selected idle trunk.

11. A telephone system comprising a connector provided with a pair of line relays, means controlled by said relays for finding the line of a called subscriber, means for causing the connector to select idle trunks, and means by which said relays are then operative and adapted for repeating or relaying switch-operating electrical impulses over the selected idle trunk.

12. A telephone system comprising an automatic connector having provisions for rotating automatically in one level thereof, for the purpose of selecting idle trunks, adapted to rotate under the control of a calling subscriber in other levels, and provided with means for repeating or relaying switch-operating electrical impulses over the selected idle trunk.

13. In a telephone system, a two-way trunk, means individual to said trunk for automatically extending connections in either direction therefrom, means individual to said trunk for repeating or relaying electrical impulses over the same in one direction, and a plurality of automatic switches to which the said trunk is common, each automatic switch provided with means for repeating or relaying switch-operating electrical impulses over said trunk in the opposite direction.

14. In a telephone system, a two-way trunk, a first-selector or numerical trunking switch individual to and adapted for extending connection from one end of said trunk, and a non-numerical trunk selecting switch individual to and adapted for extending connection from the other end of said trunk.

15. A telephone system comprising subscribers' lines and trunk-lines, a connector provided with means subject to the control of the calling subscriber for finding the line of the called subscriber, adapted also for automatically selecting and seizing an idle trunk-line, and having means by which it is then operative and adapted for repeating or relaying switch-operating electrical impulses over the selected idle trunk line.

16. A telephone system comprising a main exchange, a branch exchange, means by which the branch exchange subscribers may call each other automatically, means by which the main exchange subscribers may call each other automatically, and two-way trunks extending from one exchange to the other, the equipment at the branch exchange comprising non-numerical individual trunk selecting switches for the subscribers thereof, and connectors adapted to either seize idle two-way trunks or find local called subscribers.

17. A telephone system comprising a main exchange and a branch exchange, automatic equipment for the main exchange including first-selectors that are individual to the subscribers thereof, two-way trunks extending from one exchange to the other, first-selectors and repeaters for the said trunks at the main exchange, and non-numerical trunk selecting switches for the said trunks at the branch exchange, the equipment at the branch exchange also including non-numerical individual trunking switches for the subscribers thereof, and connectors adapted for either finding local called subscribers or automatically selecting idle trunks leading to the main exchange, said connectors also having provisions for repeating switch-operating electrical impulses over any selected idle trunk.

18. A telephone system comprising a main exchange having subscribers' lines terminating thereat, first-selectors for said subscribers' lines, second-selectors and connectors also included in the equipment at the main exchange, a branch exchange, two-way trunks extending from one exchange to the other, first-selectors and repeaters permanently connected with the two-way trunks at the main exchange, said repeaters having multiple terminals in the second-selectors at the main exchange, and the equipment at the branch exchange including non-numerical individual trunk selecting switches for the subscribers thereof, non-numerical trunking switches for the two-way trunks terminating at the branch exchange, and automatic connectors adapted for either finding local called subscribers of automatically selecting idle trunks leading to the main exchange, said connectors of the branch exchange having provisions for repeating or relaying switch-operating electrical impulses over any selected idle trunk-line.

19. In a telephone system, a two-way trunk, a first numerical switch for extending connection from one end of said trunk, a second numerical switch for seizing said trunk, and a repeater interposed between the second switch and the said trunk, said repeater and first switch being normally connected to the trunk in multiple.

20. In a telephone system, a trunk-line, a repeater permanently connected with one end of said trunk-line, multiple bank terminals for said trunk-line, normally open connections between said bank terminals and said repeater, and a relay for closing said normally open connections when connection is to be made with the said trunk-line through the medium of said terminals and repeater.

21. In a telephone system, a two-way trunk-line, a non-numerical automatic trunk-selecting switch individual to and adapted for extending connection from one end of said trunk-line, and means for automatically seizing the same end of the trunk-line when the trunking is to be effected in the opposite direction.

22. In a telephone system, a trunk-line, multiple bank terminals therefor normally and entirely disconnected therefrom, relays for connecting the same thereto, and automatic switching means for seizing said terminals responsive to calls.

23. In a telephone system, subscribers' lines and trunk-lines, and a combined line connector and trunk selector adapted also for repeating or relaying impulses over any selected idle trunk.

24. In a telephone system, a combined line connector and trunk selector and repeater, all in a unitary structure, the operative elements of which are all controlled by the same relay, as set forth.

25. In a telephone system, a switch, and an automatic connector switch adapted to seize a line and then repeat impulses thereover to the first switch.

26. In a telephone system, a connector provided with means whereby it is operated as a repeater only at a certain contact level or levels thereof, substantially as described.

27. In a telephone system, a line, a circuit controlling magnet for said line, means comprising a terminal of said line for calling the same, a conductor normally disconnected from the line for connecting the terminal and line, a circuit for said magnet, a second magnet, a circuit for said magnet for controlling the same when the line is called for breaking the circuit of said first magnet and for closing the connection between the terminal conductor and the line, and a progressively movable automatic switch for calling the line and closing the circuit of said second magnet.

28. In an automatic switching system, an exchange, a second exchange, subscribers' lines extending to said exchanges and trunk lines between said exchanges, other trunk lines local to said first exchange, automatic switches for extending a connection between subscribers' lines, and calling devices for controlling said switches, said switches operating under the control of the calling devices when manipulated in accordance with the number of the subscriber wanted, to extend the connection through an interoffice trunk line and a certain number of switches or through a local trunk line and a different number of switches according as to whether the calling and called subscribers' lines are connected to different exchanges or to one and the same exchange.

29. In a telephone system, a plurality of central stations, subscribers' lines extending thereto, interoffice and intraoffice trunks for connecting said lines, calling devices, and switches operated under the control of said calling devices when manipulated in accordance with the number of a wanted subscriber for automatically selecting and completing a connection over an intraoffice trunk through a certain number of switches or over an interoffice trunk through a greater number of switches, according to whether the calling subscriber's line terminates at the same office as the called subscriber's line or at an office external thereto.

30. In a telephone system, calling mechanism for transmitting impulses for sending either local or trunking calls, a connector for finding the called subscriber's line, when the call is local, provided with a relay for repeating the calling impulses when the call is to another station.

31. In a telephone system, a connector, means for controlling said connector in accordance with the last two digits of a called number, and a selector, said connector having a relay for controlling the selecting operation of said selector.

32. In a telephone system, a connector, means for controlling said connector in accordance with the last two digits of the called number, and a plurality of selectors, said connector having a relay for successively controlling said selectors.

33. A telephone exchange system comprising a selector and a connector adapted to be operated in accordance with the last digit of a called number, and means controlled by said connector for repeating impulses to selectively operate said selector switch.

34. In a telephone system, a connector, a plurality of selectors, another connector, a relay for the first connector, said selectors and second connector being successively controllable by said relay.

35. In a telephone system a talking circuit, a plurality of connectors connected with said circuit, and a plurality of selectors connected with the circuit between said connectors.

36. In a telephone system, calling mechanism for transmitting impulses for sending either local or trunking calls, subscribers' lines divided into groups, and a connector for finding the called subscriber's line, when the call is local, provided with a relay for repeating the calling impulses when the call is to another station, said connector having motion in one plane to select groups and motion in a plane at right-angles thereto to find a line in the selected group.

37. In a telephone system, subscribers' lines divided into groups, a connector, means for controlling said connector in accordance with the last two digits of a called number, and a selector, said connector having a relay for controlling the selective operation of said selector, said connector having motion in one plane to select groups and motion in a plane at right-angles thereto to find a line in the selected group.

38. In a telephone system, subscribers' lines divided into groups, a connector, means for controlling said connector in accordance with the last two digits of the called number, and a plurality of selectors, said connector having a relay for successively controlling said selectors, said connector having motion in one plane to select groups and motion in a plane at right-angles thereto to find a line in the selected group.

39. In a telephone system, subscribers' lines divided into groups, a connector, a plurality of selectors, another connector, a relay for the first connector said selectors and second connector being successively controllable by said relay, said connectors having motion in one plane to select groups and motion in a plane at right-angles thereto to find a line in the selected group.

40. In a telephone system, a relay, an automatic switch provided with a wiper for closing a circuit to energize said relay, and a talking connection controlled by said relay, said switch provided with means for repeating impulses over said talking connection.

41. In a telephone system, a trunk line having a normally open contact, a relay for closing said contact, and a progressively movable switch provided with mechanism for seizing said trunk line, for closing the energizing circuit for said relay, and for repeating impulses over said trunk line through said contact.

Signed by me at Chicago, Cook county, Illinois, this 23rd day of May, 1917.

TALBOT G. MARTIN.